United States Patent
Gangumalla et al.

(10) Patent No.: US 12,493,523 B2
(45) Date of Patent: Dec. 9, 2025

(54) METHODS AND APPARATUS TO IMPLEMENT FAILURE RECOVERY OF DATA

(71) Applicant: Cloudera, Inc., Santa Clara, CA (US)

(72) Inventors: Uma Maheswara Rao Gangumalla, Milpitas, CA (US); Prashant Pogde, Sunnyvale, CA (US); Siddharth Jivan Wagle, Saratoga, CA (US); Ritesh H. Shukla, Saratoga, CA (US); Karthik Krishnamoorthy, Fremont, CA (US)

(73) Assignee: Cloudera, Inc., Santa Clara, CA (US)

( * ) Notice: Subject to any disclaimer, the term of this patent is extended or adjusted under 35 U.S.C. 154(b) by 36 days.

(21) Appl. No.: 18/525,281

(22) Filed: Nov. 30, 2023

(65) Prior Publication Data
US 2025/0181451 A1   Jun. 5, 2025

(51) Int. Cl.
*G06F 11/00* (2006.01)
*G06F 11/10* (2006.01)

(52) U.S. Cl.
CPC .............................. *G06F 11/1092* (2013.01)

(58) Field of Classification Search
CPC ............ G06F 11/1076; G06F 11/1088; G06F 11/1092
See application file for complete search history.

(56) References Cited

U.S. PATENT DOCUMENTS

| | | | |
|---|---|---|---|
| 9,354,991 B2 * | 5/2016 | Bennett | G06F 11/2058 |
| 2014/0047266 A1 * | 2/2014 | Borthakur | G06F 11/2053 |
| | | | 714/6.24 |
| 2014/0380126 A1 * | 12/2014 | Yekhanin | G06F 11/1076 |
| | | | 714/766 |
| 2017/0097875 A1 * | 4/2017 | Jess | G06F 11/1092 |

* cited by examiner

*Primary Examiner* — Marc Duncan
(74) *Attorney, Agent, or Firm* — Hanley, Flight & Zimmerman, LLC

(57) ABSTRACT

Disclosed examples include writing first information blocks in first storage; transmitting second information blocks to second storage, the first and second information blocks including data blocks and parity blocks; determining whether a failed information block can be reconstructed based on available ones of the first information blocks in the first storage; and writing a reconstructed information block in the first storage to replace the failed information block.

23 Claims, 13 Drawing Sheets

METHODS AND APPARATUS TO IMPLEMENT FAILURE RECOVERY OF DATA

FIELD OF THE DISCLOSURE

This disclosure relates generally to computer-based storage and, more particularly, to methods and apparatus to implement failure recovery of data.

BACKGROUND

Distributed computing systems include computers and/or other devices connected across a network. For example, computers can communicate with one another using network protocols to access data, exchange messages, control processes, etc. In some computing systems, data storage resources associated with computers and/or stand-alone data storage resources are accessible via the network. Such data storage resources can be used to store data for subsequent retrieval by computers. For example, software systems that manage distributed data storage can stretch across multiple data centers to enable client computers to access data from any of the multiple data centers.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
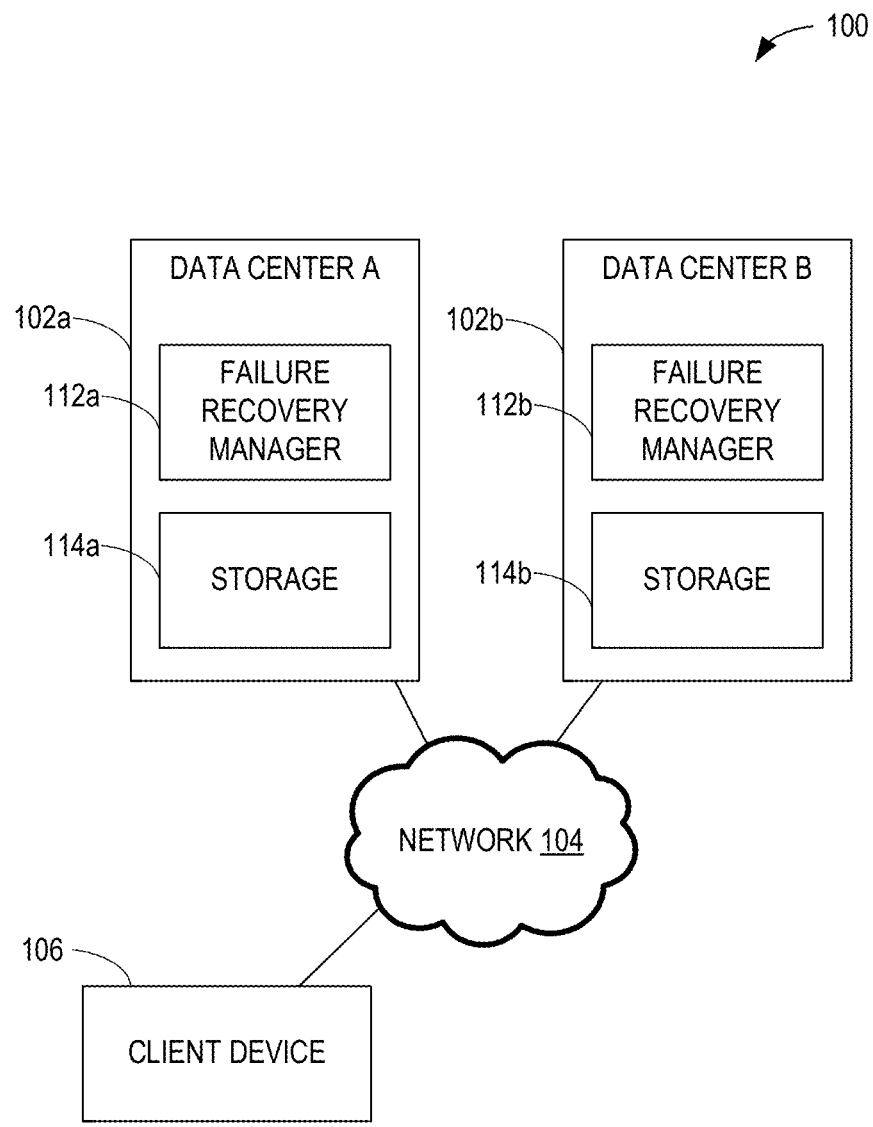
FIG. 1 is a block diagram of an example environment in which data centers operate.

Data durability can be implemented in distributed systems to enable recovery of data due to data corruption, resource failures, and/or otherwise unavailability of data. Prior approaches to data durability use replication models in which the entirety of data in one storage resource of a cluster is identically stored in duplicate in another data storage resource of the cluster. However, replication is expensive because it keeps multiple copies of the same data in the cluster which uses at least twice the amount of storage capacity (e.g., to store two identical copies of the data).

Data durability can be used to make data highly available for applications even in the event of disasters. For example, data durability can be implemented by using multiple data centers. Using low-latency networking between two data centers enables use of those two data centers to create data center recovery configurations in which failure of one data center does not degrade quality of service or create unavailability of the stored data at another data center. That is, if one data center becomes unavailable, data access can be provided by the operational data center(s) in a manner that satisfies a quality of service agreed upon by a customer and a storage service provider. In such data center recovery configurations, software systems stretch clusters across two data centers. Due to the low-latency networking, latency is largely unnoticeable.

To achieve the same level of data durability in the event of disasters, prior approaches quadruple the overall storage footprint of data to ensure data durability guarantees within a data center and across multiple data centers. For example, data center 1 can store two duplicate replicas of data for local data recovery in the event of a local data failure. In addition, data center 2 stores two replicas of the same data to survive unavailability of data center 1 in the event of a disaster. This 4× storage overhead of prior approaches significantly increases storage cost.

Unlike prior approaches that store identical duplicates of data in different storage resources, examples disclosed herein use data reconstruction techniques to make data highly available. That is, examples disclosed herein provide failure-recovery configurations across multiple data storage resources without needing to store identical duplicative instances of the data across those multiple data storage resources. Examples disclosed herein represent data of interest using multiple information blocks that are unique relative to one another and from which a failed one of those blocks can be reconstructed. These information blocks are distributed across at least two data centers. In the event of a failed information block, examples disclosed herein use information reconstruction techniques to reconstruct the failed information block based on remaining available ones of the information blocks. Examples disclosed herein use the reconstructed information block to replace the failed information block so that requested data corresponding to the failed information block can continue to be served based on the reconstructed information block, thereby providing highly available data. As used herein, a failed information block or an information block that has failed refers to an information block that is unavailable, inaccessible, and/or corrupt. Unavailability or inaccessibility may be due to a failed node (e.g., a failed storage resource node, a failed server node, etc.), a loss of communication with a node, data loss, viruses, etc. In a corrupt information block, information retrievable from an address space is no longer representative of the information most recently written to that address space. This could be due to hardware malfunctions, software errors, viruses, etc. Example failure-recovery configurations disclosed herein can reduce a storage footprint of highly available data by up to 40% compared to prior approaches that use replication models.

To reconstruct failed information blocks, examples disclosed herein employ forward error correction (FEC) codes. For example, failure-recovery techniques disclosed herein use FEC codes to generate parity blocks corresponding to data blocks of interest. As used herein, information blocks collectively refers to data blocks and parity blocks. When an information block fails, remaining ones of the available information blocks can be used to reconstruct the failed information block. For example, at any point in time, a number of 'n' information blocks (e.g., any information blocks from data blocks and parity blocks) may be used to reconstruct a failed information block. In examples disclosed herein, the number of 'n' information blocks is equal to the number of original data blocks being protected. For example, if data to be protected is parsed into five data blocks, FEC is used to generate five parity blocks based on the original five data blocks to create a total of 10 information blocks (e.g., five data blocks and five parity blocks). Upon failure of any information block (e.g., a data block or a parity block), the failed information block can be reconstructed using any available five (e.g., 'n') information blocks regardless of whether the available information blocks are data blocks, parity blocks, or a combination of data blocks and parity blocks. As such, when information blocks are distributed across two data centers, a data center can use a number of remaining information blocks to recover the failed information block.

FIG. 1 is a block diagram of an example environment 100 in which a data center A 102a and a data center B 102b operate. In example FIG. 1, the data centers 102a,b are connected via a network 104. The example environment 100 also includes a client device 106 that can access data (e.g., read, write, and/or modify data) in the data centers 102a,b via the network 104. The example client device 106 may access resources in the data center 102a,b using server application programming interfaces (APIs), storage APIs, and/or any other APIs to communicate directly with the resources via the network 104. In some examples, one or both of the data centers 102a,b may be provisioned in a cloud environment. For example, if one of the data centers 102a,b operates in a cloud, resources therein may be accessed using cloud APIs and resources of the other one of the data centers 102a,b that is not in the cloud may be accessed using server APIs or other non-cloud APIs. Example cloud types that may be used with one or both of the data centers 102a,b include a private enterprise cloud, a public cloud provided by a third-party cloud service provider, and/or a hybrid cloud that includes private and public cloud portions. For example, both data centers 102a,b could be in a private cloud, both could be in a public cloud, or one could be in a private cloud and the other could be in a public cloud. Yet still, one or both of the data centers 102a,b may include resources provisioned across both private and public clouds, thus operating in a hybrid cloud. In example FIG. 1, each data center 102a,b includes a failure recovery manager 112a, 112b and storage resources 114a, 114b. The example failure recovery managers 112a, 112b are provided to generate information blocks, distribute information blocks between the storage resources 114a,b, perform failure monitoring, request reconstruction of failed information blocks, and reconstruct failed information blocks in accordance with examples disclosed herein. The example failure recovery managers 112a,b are described in more detail below in connection with FIG. 7.

The example storage resources 114a,b may be implemented using any suitable hardware data storage devices such as magnetic hard disk drives (HDDs), solid state drives (SSDs), flash storage, etc. The example storage resources 114a,b are provided to store information blocks. In some examples, the storage resources 114a,b are connected to servers such that accessing information in the storage resources 114a,b is by way of communicating with those servers. In other examples, the storage resources 114a,b are network-attached storage (NAS) devices in that they are connected to a network through a network interface without an intermediary server. In any case, examples disclosed herein may be implemented with any suitable type of storage resource.

Figure 2:
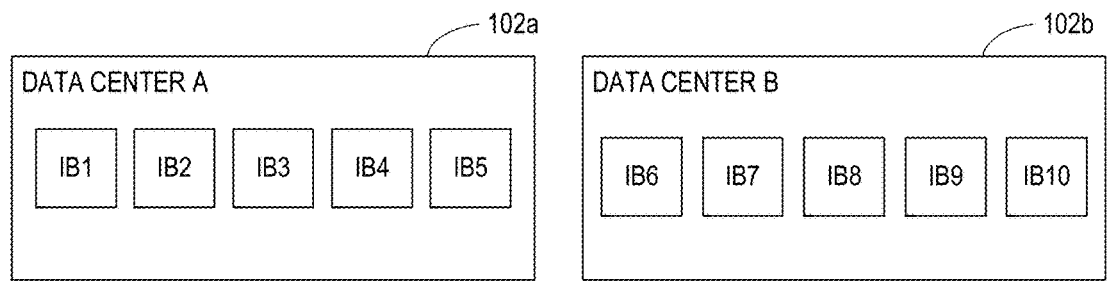
FIG. 2 is a block diagram of the data centers of FIG. 1 that store distributed information blocks.

FIG. 2 is a block diagram of the data centers 102a,b of FIG. 1 that store distributed information blocks (IBs). For example, ten information blocks IB1-IB10 form a block group of information blocks that include both data blocks and parity blocks. In example FIG. 2, data of interest is parsed into five data blocks represented by five of the ten information blocks IB1-IB10. In addition, examples disclosed herein use FEC codes to generate five parity blocks based on the five data blocks. The five parity blocks are represented by five of the ten information blocks IB1-IB10 that are not data blocks. As such, each information block is unique relative to others of the information blocks. That is, each data block is unique relative to other data blocks and the parity blocks in the grouping of information blocks IB1-IB10, and each parity block is unique relative to other parity blocks and the data blocks in the grouping of information blocks IB1-IB10. Although examples disclosed herein are described based on data being parsed into five data blocks, any other number 'n' of data blocks may be used. For example, data to be protected may be parsed into three data blocks, seven data blocks, ten data blocks, etc. In any case, the number of parity blocks generated is equal to the number of data blocks. As such, if data is parsed into three data blocks, three parity blocks are generated for a total of six information blocks (e.g., 3 data blocks+3 parity blocks=6 information blocks).

Examples disclosed herein may be implemented using any suitable type of FEC algorithm to generate parity blocks based on data blocks and to reconstruct failed information blocks based on available information blocks. In addition, examples disclosed herein may be implemented using any other suitable technique instead of or in addition to FEC to reconstruct information blocks. In some examples, FEC may be used to generate parity blocks and another reconstruction technique may be used to reconstruct failed information blocks. In yet other examples, examples disclosed herein may use a non-FEC algorithm to generate parity blocks and to reconstruct failed information blocks.

In examples disclosed herein, each information block IB1-IB10 is stored in a separate storage resource node of the storage resources 114a,b. For example, information block IB1 is stored in a first storage resource node assigned a first storage resource identifier in data center A 102a and information block IB2 is stored in a second storage resource node assigned a second storage resource identifier in data center A 102a. In this manner, each of the information blocks IB1-IB5 is stored in a separate storage resource node in data center A 102a and each storage resource node is assigned a different storage resource identifier. Similarly, each of the information blocks IB6-IB10 is stored in a separate storage resource node in data center B102b and each of those storage resource nodes is assigned a different storage identifier.

The information blocks IB1-IB10 can be identified using a block group identifier and corresponding block identifiers. A block group identifier identifies the group of the information blocks IB1-IB10 and is unique relative to block group identifiers of other information block groups stored in the data centers 102a,b. A block identifier identifies a particular information block. For example, each information block IB1-IB10 may be assigned a different identifier that is unique within its block group. In some examples, metadata including the block group identifier and a corresponding block identifier may be stored in each of the information blocks IB1-IB10. In some examples, the metadata also includes a block-to-storage map that represents a mapping of the information blocks IB1-IB10 and storage resource identifiers of data stores in which the information blocks IB1-IB10 are stored. In other examples, one instance of such a block-to-storage map is stored separate from the information blocks IB1-IB10 in each of the data centers 102a,b. An example block-to-storage mapping for information blocks IB1-IB10 maps block identifiers of information blocks IB1-IB5 to storage resource identifiers of corresponding storage resources 114a (FIG. 1), and maps block identifiers of information blocks IB6-IB10 to storage resource identifiers of corresponding storage resources 114b (FIG. 1).

Five of the information blocks IB1-IB10 (e.g., any combination of unique data and parity blocks) can be stored in one data center and the remaining five information blocks can be stored in the other data center. In example FIG. 2, data center A 102a stores information blocks IB1, IB2, IB3, IB4, and IB5 in the storage resources 114a of FIG. 1, and data center B 102b stores information blocks IB6, IB7, IB8, IB9, and IB10 in the storage resources 114b of FIG. 1. In some examples, storage resources of a data center can be partitioned into multiple stripes. In such examples, the information blocks IB1-IB10 can be assigned to a stripe that spans across the storage resources 114a,b.

The information blocks IB1-IB5 include any combination of non-duplicate data blocks and/or parity blocks and the information blocks IB6-IB10 include the remaining ones of the data blocks and/or parity blocks that are not in the information blocks IB1-IB5. As such, the five information blocks IB1-IB5 stored in data center A 102a are not duplicative of the five information blocks IB6-IB10 at data center B 102b. However, by using FEC codes, in the event of a failed information block in one data center, that failed information block (e.g., a data block or a parity block) can be reconstructed based on FEC so long as there are five remaining information blocks that are available. As such, in the event one data center fails or otherwise becomes unavailable, the lost information blocks of that data center can be recovered based on the remaining five information blocks at the other data center. In some examples, one data center may store a combination of data blocks and parity blocks and the other data center may store a combination of the other data blocks and parity blocks. In such examples, the data blocks and parity blocks of a failed data center can be reconstructed based on the data blocks and parity blocks of the non-failed data center. Alternatively, in other examples, one data center may store all the data blocks and the other data center may store all the parity blocks. If the data center with all the data blocks fails, those data blocks can be reconstructed based on the parity blocks in the non-failed data center. Similarly, if the data center with all the parity blocks fails, those parity blocks can be reconstructed based on the data blocks in the non-failed data center. This can achieve a tolerance level of one, meaning that one data center can fail without compromising the availability of the data because of the remaining information blocks in the still-available data center.

Figure 3A:
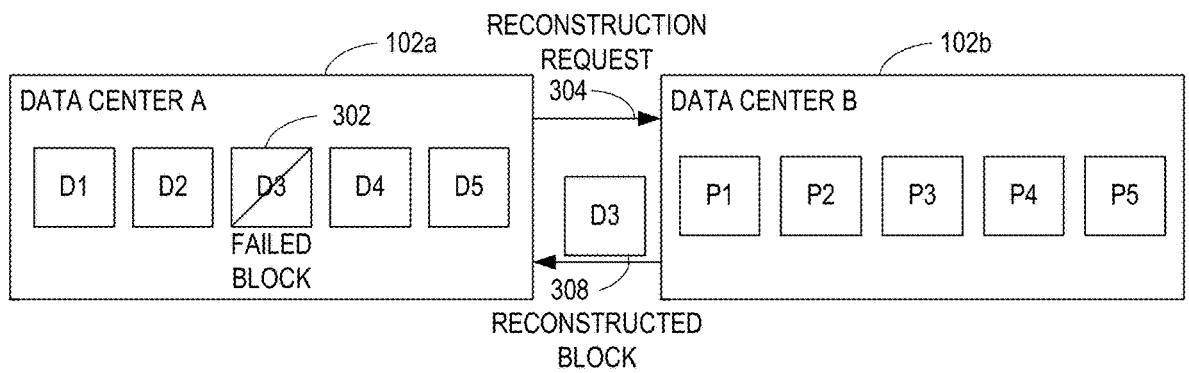
FIGS. 3A-3C are block diagrams of the data centers of FIGS. 1 and 2 in which failed information blocks are recoverable using remotely stored information blocks.
Figure 3B:
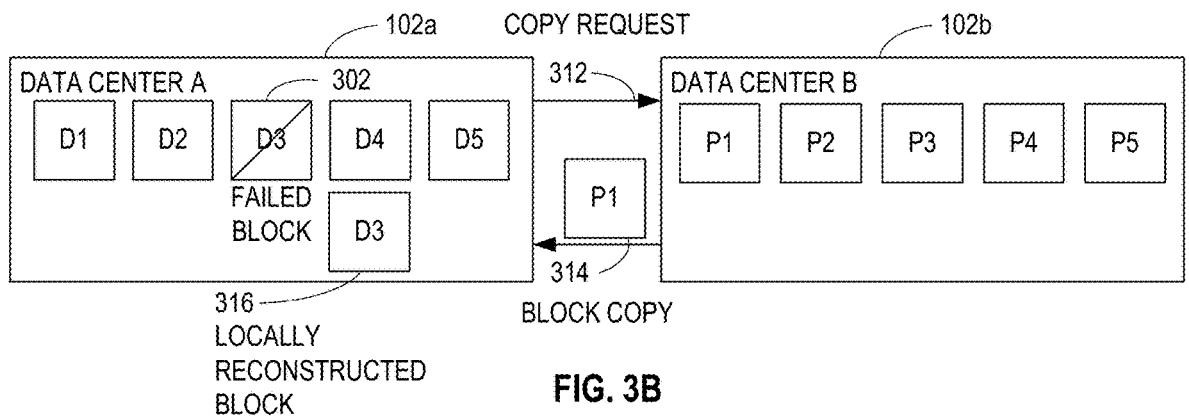
Figure 3C:
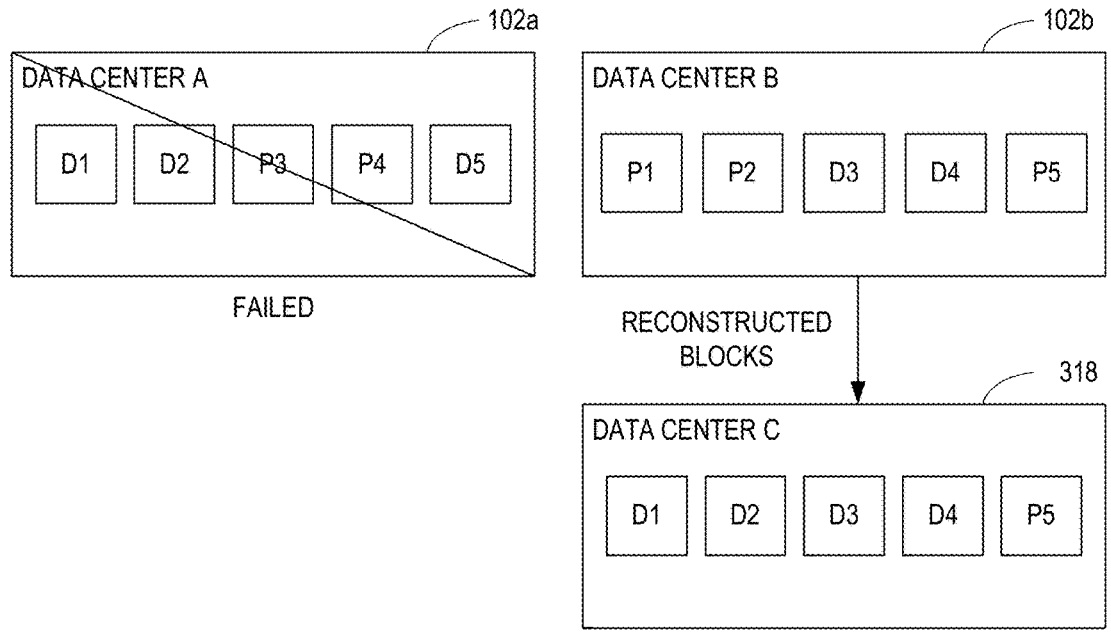

FIGS. 3A-3C are block diagrams of the data centers 102a,b of FIGS. 1 and 2 in which failed blocks are recoverable using remotely stored information blocks. In example FIGS. 3A-3C, the information blocks IB1-IB10 include five data blocks D1-D5 and five parity blocks P1-P5. The five parity blocks P1-P5 are generated based on the five data blocks D1-D5 using FEC codes. In examples disclosed herein, the number of information blocks 'n' to reconstruct a lost data block using FEC is equal to the number of data blocks that represent the data of interest. For example, since original data of interest is parsed into the five data blocks D1-D5 in FIGS. 3A-3C, a failed data block or a failed parity block can be reconstructed using FEC based on five (e.g., 'n') available information blocks.

In example FIG. 3A, data center A 102a stores the five data blocks D1-D5 in the storage resources 114a of FIG. 1, and data center B 102b stores the five parity blocks P1-P5 in the storage resources 114b of FIG. 1. Although all of the data blocks D1-D5 are in one data center and all of the parity blocks P1-P5 are in the other data center in example FIG. 3A, examples disclosed herein may be implemented with any combinations of non-repeated data blocks and/or parity blocks in one data center and the remaining data blocks and/or parity blocks in the other data center. Such an example is shown in FIG. 3C in which data center A 102a stores data blocks D1, D2, D5 and parity blocks P3, P4, and data center B 102b stores parity blocks P1, P2, P5 and data blocks D3, D4.

Turning to example FIG. 3A, data block D3 is shown as a failed information block 302 at data center A 102a. After detection of the failed information block 302, data center A 102a sends a reconstruction request 304 to data center B 102b. The example reconstruction request 304 includes a block group identifier, a block identifier, and a reconstruction command code. The block group identifier identifies the block group corresponding to the failed information block 302 and the block identifier identifies the failed information block 302. The reconstruction command code is indicative of a request for reconstruction of an information block identified by the block group identifier and the block identifier in the reconstruction request 304.

When data center B 102b receives the reconstruction request 304, data center B 102b identifies the failed information block 302 to be reconstructed based on the block group identifier and the block identifier in the reconstruction request 304. Data center B 102b uses the block group identifier to identify the five parity blocks P1-P5 as corresponding to the same block group associated with the failed information block 302. Data center B 102b then performs a reconstruction process based on FEC and the five parity blocks P1-P5 in data center B 102b to generate a reconstructed information block 308. Data center B 102b also includes any corresponding metadata in the reconstructed information block 308. The example reconstructed information block 308 includes the same information as the failed information block 302 and can be used as a substitute for the failed information block 302. After the reconstruction, data center B 102b sends the reconstructed information block 308 to data center A 102a. In this manner, after receiving the reconstructed information block 308, data center A 102a stores the reconstructed information block 308 in its corresponding storage resource 114a (FIG. 1) to be used in place of the failed information block 302 so that data center A 102a can continue to serve data from data block D3.

FIG. 3B represents an alternative manner of recovering the failed information block 302. In example FIG. 3B, after detecting the failed information block 302, data center A 102a sends a copy request 312 to data center B 102b. The example copy request 312 includes a block group identifier and a block copy command code. The block group identifier indicates the block group from which a block copy should be selected at data center B 102b. The block copy command code causes data center B 102b to return a block copy 314 of one of the available parity blocks P1-P5 to data center A 102a. In example FIG. 3B, the block copy 314 is shown as parity block P1 but may be any other available information block from data center B 102b that is in the same block group as data blocks D1-D5. This will result in data center A 102a having five information blocks which satisfies the threshold number of blocks ('n') needed to reconstruct the failed information block 302. As such, data center A 102a can locally reconstruct the failed information block 302 to generate locally reconstructed information block 316 based on FEC and the still-available data blocks D1, D2, D4, D5 in data center A 102a and the copy of the parity block from data center B 102b. Data center A 102a stores the locally reconstructed information block 316 in its corresponding storage resource 114a (FIG. 1) to be used in place of the failed information block 302 so that data center A 102a can continue to serve data from data block D3. Although FIG. 3B shows a single block copy sent by data center B 102b to data center A 102a, if multiple information blocks fail in data center A 102a, the copy request 312 may request copies of multiple blocks from data center B 102b to satisfy the threshold number of blocks ('n') needed at data center A 102a to reconstruct its failed information blocks. In other examples, if multiple information blocks fail in both data centers 102a,b, the failed information blocks can be reconstructed as long as the total still-available information blocks across both data centers 102a,b is equal to the original number 'n' of data blocks. For example, in FIG. 3B if data blocks D3 and D4 fail in data center A 102a and parity blocks P1, P3, P4 fail in data center B 102b, the copy request 312 can be structured by data center A 102a to cause data center B 102b to send the non-failed parity blocks P2 and P5 to data center A 102a so that data center A 102a has the threshold number 'n' of information blocks, which is five in this example (e.g., 'n'=5), to reconstruct the failed data blocks D3 and D4 and the failed parity blocks P1, P3, P4. Data center A 102a can then store the reconstructed data blocks D3, D4 locally to replace the failed data blocks D3, D4 and can send the reconstructed parity blocks P1, P3, P4 to data center B 102b to replace the failed parity blocks P1, P3, P4.

Turning to FIG. 3C, the entirety of data center A 102a is failed. Unlike the distribution of the information blocks D1-D5 and P1-P5 in example FIGS. 3A and 3B, example FIG. 3C shows a different information block distribution. For example, data center A 102a stores data blocks D1, D2, D5 and parity blocks P3, P4 (e.g., in the storage resources 114a of FIG. 1), and data center B 102b stores parity blocks P1, P2, P5 and data blocks D3, D4 (e.g., in the storage resources 114b of FIG. 1). As such, the failure of data center A 102a in FIG. 3C makes data blocks D1, D2, D5 and parity blocks P3, P4 failed information blocks. After data center B 102b detects the failure of data center A 102a, data center B 102b reconstructs data blocks D1, D2, D5 (data blocks D3 and D4 do not need to be reconstructed because they are already stored in data center B 102b). In this manner, any request for data in the data blocks D1, D2, D5 can be serviced by data center B 102b during the outage of data center A 102a. In some examples, in the interest of saving storage capacity and/or processing resources in the available data center B 102b, reconstruction of the parity blocks P3, P4 can be delayed until a remote data center to store the reconstructed blocks is made active again. Such delay in reconstructing the parity blocks P3, P4 is acceptable since any data requests from client devices (e.g., the client device 106 of FIG. 1) will be for data in the data blocks D1-D5.

In some examples, data center B 102b waits a threshold duration to determine whether data center A 102a comes back online. For example, a disaster recovery process may successfully bring data center A 102a back online for access by data center B 102b and by client devices (e.g., the client device 106 of FIG. 1). If data center A 102a comes back online within the threshold duration, data center B 102b sends the information blocks D1, D2, D5, P3, P4 to data center A 102a to store those information blocks in the storage resource 114a (FIG. 1) and data center B 102b deletes those blocks locally to free up local storage capacity. In this manner, any changes that were made to any of the data blocks D1-D5 in data center B 102b during the outage of data center A 102a are reflected in the information blocks D1, D2, D5, P3, P4 in data center A 102a so that data center A 102a has the most up-to-date information. For example, if a change was made to data block D1 in data center B 102b, updated data block D1 is sent to data center A 102a after data center A 102a recovers. Similarly, when changes are made to any of the data blocks D1-D5, the parity blocks P1-P5 are updated using FEC based on the most recent data blocks D1-D5. The updated parity blocks P1-P5 are then re-distributed across the data centers 102a,b.

If data center A 102a does not come back online within the threshold duration, data center B 102b can request provisioning of storage resources at a separate data center. In example FIG. 3C, the separate data center is shown as data center C 318. After provisioning of the storage resources at data center C 318, data center B 102b sends the reconstructed information blocks D1, D2, D5, P3, P4 to data center C 318 to be stored in corresponding ones of the recently provisioned storage resources of data center C 318. In addition, to free up storage space in data center B 102b, the reconstructed information blocks D1, D2, D5, P3, P4 are deleted from data center B 102b. In this manner, data center C 318 assumes the role of data center A 102a for the information blocks D1, D2, D5, P3, P4 so that high availability of the data represented by the data blocks D1-D5 is provided by data center B 102b and data center C 318.

Figure 4:
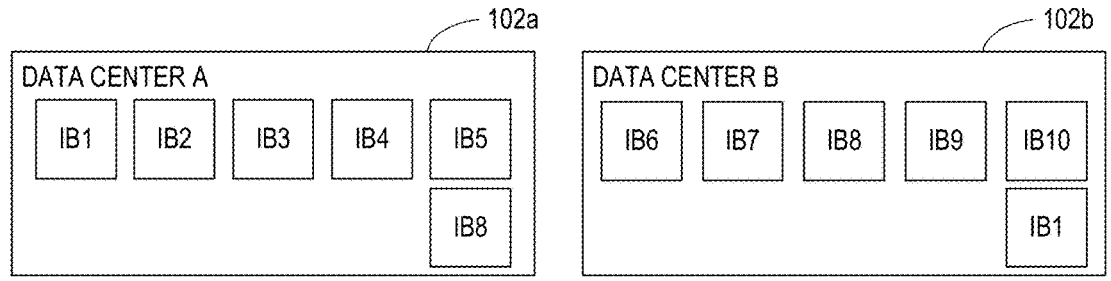
FIG. 4 is a block diagram of the data centers of FIG. 1 to store distributed information blocks in an alternative configuration to tolerate a failure of a remote data center and a concurrent failure of an information block at a local data center.

FIG. 4 is a block diagram of the data centers 102a,b of FIG. 1 to store distributed information blocks in an alternative configuration to tolerate a failure of a data center and a concurrent failure of a local information block. The example information block distribution of FIG. 4 provides a tolerance level of two, meaning that data can remain available even in the event of information block failures at two storage sites. For example, as described below in connection with FIGS. 5A-5C, when information blocks are lost at both data centers 102a,b, FEC can be used to recover those information blocks based on remaining ones of the information blocks.

In example FIG. 4, ten information blocks IB1-IB10 form a block group of information blocks that includes both data blocks and parity blocks. In example FIG. 4, data of interest is parsed into five data blocks represented by five of the ten information blocks IB1-IB10. In addition, as in FIG. 2 described above, FEC codes are used to generate five parity blocks based on the five data blocks. The five parity blocks are represented by five of the ten information blocks IB1-IB10 that are not data blocks. Each information block includes metadata, as described above in connection with FIG. 2, and each information block is unique relative to others of the information blocks.

In example FIG. 4, in addition to distributing the information blocks IB1-IB10 across the data centers 102a,b in two unique combinations of non-duplicative information blocks, an extra information block is stored in both of the data centers 102a,b. The extra information block in data center A 102a is a copy of an information block (e.g., IB8) from data center B 102b, and the extra information block in data center B 102b is a copy of an information block (e.g., IB1) from data center A 102a. As described below in connection with FIGS. 5A-5C, these additional information blocks in the data centers 102a,b allow for information block recovery in the event that information blocks fail concurrently at both data centers 102a,b and/or in the event of a full failure of one data center and a failure of a local information block at the available data center. In some examples, the storage resources 114a,b can be partitioned into multiple stripes. In such examples, the information blocks IB1-IB10 can be stored in a stripe that spans the storage resources 114a,b across the data centers 102a,b. As such, the block group of the information blocks IB1-IB10 is stored in a single stripe across data center A 102a and data center B 102b.

The tolerance level of two achievable using the information block distributions of FIGS. 4 and 5A-5C is the same high availability of data that is achieved by prior data protection approaches that use replication mode. In prior replication mode approaches, four full duplicate copies of data are stored across two data centers. For example, two full duplicate copies of the data are stored in a first data center and an additional two full duplicate copies of the data are stored in a second data center to be able to recover from full failure of one data center and failure of one local information block at the non-failed data center. If data of interest is parsed into five data blocks under the prior replication mode approach, five blocks multiplied by four copies equals 20 total blocks of storage capacity needed for failure recovery. However, unlike the prior replication mode approach that requires significant storage capacity for the full four identical copies of the data, examples disclosed herein provide data recovery using significantly less storage capacity by storing fewer data blocks and parity blocks across two data centers. For example, as shown in FIG. 4, for a tolerance level of two, the six information blocks IB1-IB5, IB8 in data center A 102a and the six information blocks IB6-IB10, IB1 in data center B 102b use 12 total blocks of storage capacity to be able to recover any of the ten information blocks upon information block failure. Such 12 blocks of storage capacity for failure recovery in accordance with examples disclosed herein is substantially less than the 20 total blocks of storage capacity of prior replication mode approaches yet examples disclosed herein can still achieve the same tolerance level of two for data recovery. This is a savings of 40% in storage capacity relative to the prior replication mode approach. In other implementations, to increase the data recovery resiliency of each data center 102a,b, examples disclosed herein may be adapted to include more than one block copy in a local data store from a remote data store. For example, to tolerate a failure of a data center 102a,b and concurrent failures of two information blocks, each data center 102a,b can store five unique information blocks (e.g., IB1-IB5 or IB6-IB10) and two copies of information blocks from the other data center 102a,b for a total of seven local information blocks. Based on those seven local information blocks, a data center could concurrently lose two information blocks and still have five local information blocks to reconstruct the two failed information blocks.

Figure 5A:
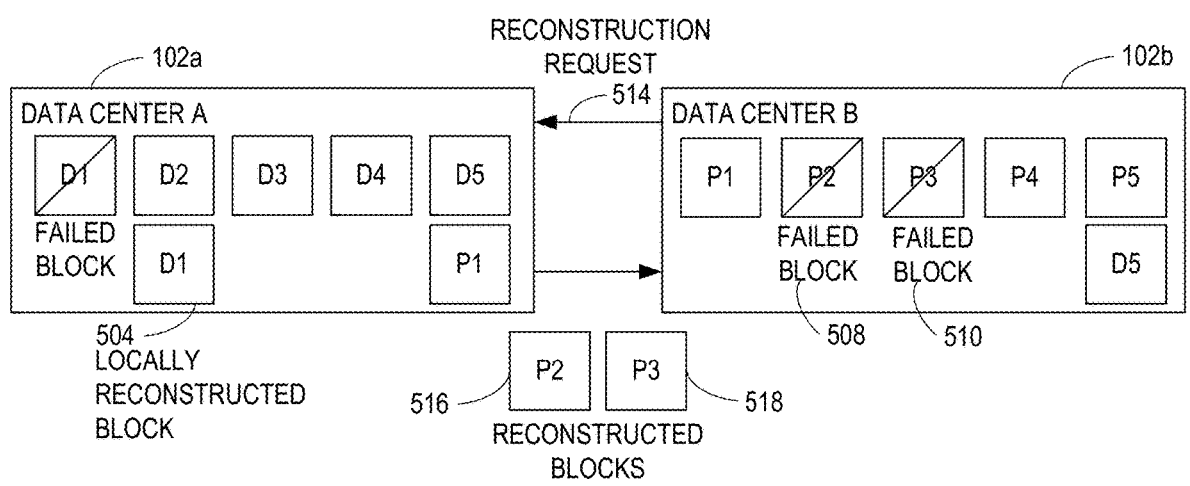
FIGS. 5A-5C are block diagrams of the data centers of FIGS. 1 and 4 in which information blocks that fail concurrently at both data centers are recoverable.
Figure 5B:
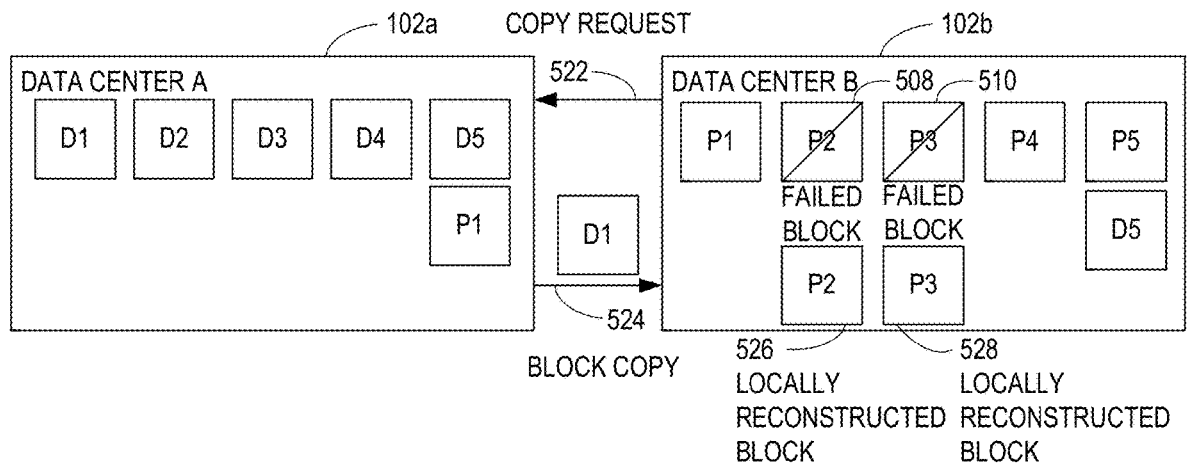
Figure 5C:
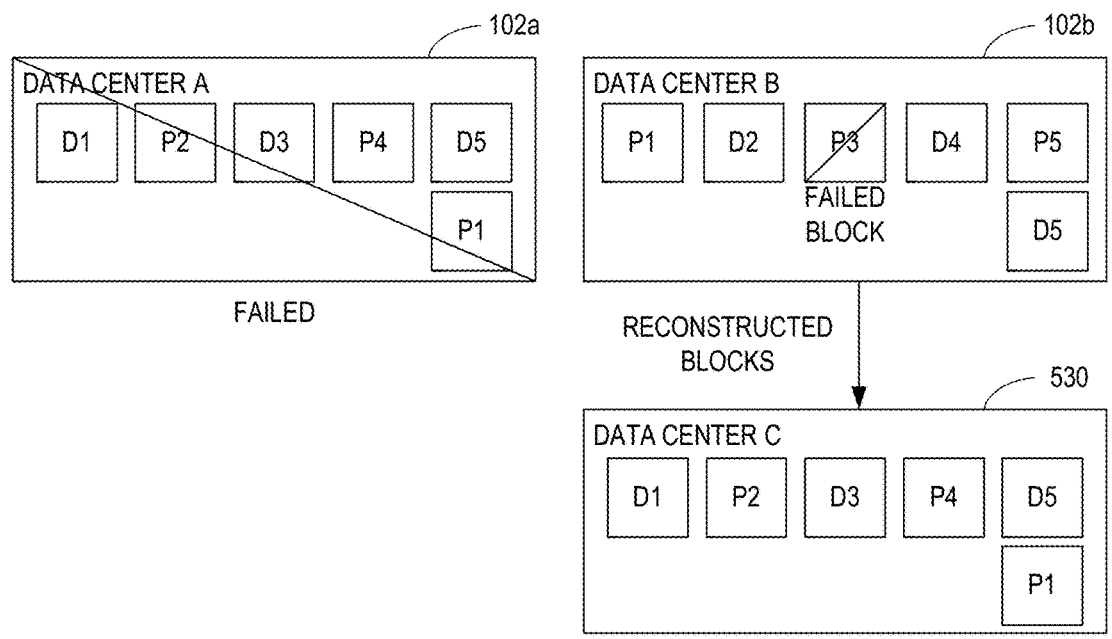

FIGS. 5A-5C are block diagrams of data centers 102a,b of FIGS. 1 and 4 in which information blocks that fail concurrently at both data centers 102a,b are recoverable. In example FIG. 5A, data center A 102a stores data blocks D1-D5 and a copy of parity block P1 in the storage resources 114a of FIG. 1, and data center B 102b stores parity blocks P1-P5 and a copy of data block D5 in the storage resources 114b of FIG. 1. As such, the example information block distribution of FIG. 5A places a duplicate copy of the parity block P1 from the data center B 102b into data center A 102a and places a duplicate copy of data block D5 from data center A 102a into data center B 102b. Since the data of interest is parsed into five data blocks D1-D5, a failed information block can be reconstructed using five available information blocks. Although the data blocks D1-D5 are in one data center and the parity blocks P1-P5 are in the other data center in example FIG. 5A, examples disclosed herein may be implemented with any combinations of non-repeated data blocks and/or parity blocks in one data center and the remaining data blocks and/or parity blocks in the other data center. Such an example is shown in FIG. 5C in which data center A 102a stores data blocks D1, D3, D5 and parity blocks P2, P4, and data center B 102b stores parity blocks P1, P3, P5 and data blocks D2, D4.

Having six information blocks in each data center 102a,b, as shown in example FIG. 5A, allows each data center 102a,b to locally reconstruct a failed data block instead of needing to send a reconstruction request to the other data center. For example, data block D1 is a failed information block 502 in data center A 102a. However, since data center A 102a stores the extra copy of the parity block P1 in addition to data blocks D2-D5, data center A 102a determines that the still-available five information blocks (e.g., information blocks D2-D5 and P1) are sufficient to locally reconstruct the failed information block 502 using FEC. As such, data center A 102a locally performs a reconstruction process based on FEC and the five remaining information blocks D2-D5 and P1 in data center A 102a to generate a reconstructed information block 504. Data center A 102a also includes any corresponding metadata in the reconstructed information block 504. The example reconstructed information block 504 includes the same information as the failed information block 502. Data center A 102a writes the reconstructed information block 504 to a corresponding storage resource 114a (FIG. 1) to be used in place of the failed information block 502 of data block D1 so that data center A 102a can continue to serve data from data block D1.

In another example, data center B 102b is shown as having two failed information blocks 508, 510. In such example, since five information blocks are needed to reconstruct a failed information block, data center B 102b determines that four still-available information blocks P1, P4, P5, D5 are not sufficient to locally reconstruct the failed information blocks 508, 510. As such, data center B 102b sends a reconstruction request 514 to data center A 102a. The example reconstruction request 514 includes a block group identifier and block identifiers of the failed information blocks 508, 510. The example reconstruction request 514 also includes a reconstruction command code to indicate to data center A 102a a request for block reconstruction of the information blocks identified by the block group identifier and the block identifiers. Data center A 102a performs a reconstruction process based on FEC and five of the information blocks D1-D5 and P1 in data center A 102a to generate reconstructed information blocks 516, 518. Data center A 102a also includes any corresponding metadata in the reconstructed information blocks 516, 518. The example reconstructed information blocks 516, 518 include the same information as corresponding ones of the failed information blocks 508, 510 and can be used as a substitute for the failed information blocks 508, 510. After the reconstruction, data center A 102a sends the reconstructed information blocks 516, 518 to data center B 102b. In this manner, after receiving the reconstructed information blocks 516, 518, data center B 102b stores the reconstructed information blocks 516, 518 in corresponding ones of the storage resources 114a (FIG. 1) to be used in place of the failed information blocks 508, 510.

FIG. 5B represents an alternative manner of recovering the failed information blocks 508, 510. In example FIG. 5B, after detecting the failed information blocks 508, 510, data center B 102b sends a copy request 522 to data center A 102a. The example copy request 522 includes a block group identifier and a block copy command code. The block group identifier indicates the block group from which a block copy should be selected at data center A 102a. The block copy command code causes data center A 102a to return a block copy 524 of one of the available data blocks D1-D5 to data center B 102b. In example FIG. 5B, the block copy 524 is shown as data block D1 but may be any other available information block from data center A 102a that is in the same block group as parity blocks P1-P5. This will result in data center B 102b having five information blocks which satisfies the threshold number of blocks ('n') needed to reconstruct the failed information blocks 508, 510. As such, data center B 102b can locally reconstruct the failed information blocks 508, 510 to generate locally reconstructed information blocks 526, 528 using FEC based on the still-available information blocks P1, P4, P5, D5 in data center B 102b and the copy of the data block D1 from data center A 102a. Data center B 102b stores the locally reconstructed information blocks 526, 528 in corresponding ones of the storage resources 114b (FIG. 1) to be used in place of the failed information blocks 508, 510. Although FIG. 5B shows a single block copy sent by data center A 102a to data center B 102b, if more than two information blocks fail in data center B 102b, the copy request 522 may request copies of multiple blocks from data center A 102a to satisfy the threshold number of blocks ('n') needed at data center B 102b to reconstruct its failed information blocks.

Turning to FIG. 5C, the entirety of data center A 102a is failed. Unlike the distribution of the information blocks in example FIGS. 5A and 5B, example FIG. 5C shows the block distribution as data center A 102a storing data blocks D1, D3, D5 and parity blocks P1, P2, P4 (e.g., in the storage resources 114a of FIG. 1), and data center B 102b storing parity blocks P1, P3, P5 and data blocks D2, D4, D5 (e.g., in the storage resources 114b of FIG. 1). As such, the failure of data center A 102a in FIG. 5C makes data blocks D1, D3, D5 and parity blocks P2, P4 failed information blocks. Parity block P1 is not failed because a copy of it is stored in data center B 102b. After data center B 102b detects the failure of data center A 102a, data center B 102b reconstructs data blocks D1, D3, D5 (data blocks D2 and D4 do not need to be reconstructed because they are already stored in data center B 102b) and stores data blocks D1, D3, D5 locally. In this manner, any request for data in the data blocks D1, D3, D5 can be serviced by data center B 102b during the outage of data center A 102a. In some examples, in the interest of saving storage capacity and/or processing resources in the available data center B 102b, reconstruction of the parity blocks P2, P4 (parity block P1 does not need to be reconstructed because a copy of it is stored in data center B 1021b) can be delayed until a remote data center to store the reconstructed blocks is made active again. Such delay in reconstructing the parity blocks P2, P4 is acceptable since any data requests from client devices (e.g., the client device 106 of FIG. 1) will be for data in the data blocks D1-D5.

In some examples, data center B 102b waits a threshold duration to determine whether data center A 102a comes back online. For example, a disaster recovery process may successfully bring data center A 102a back online for access by data center B 102b and by client devices (e.g., the client device 106 of FIG. 1). If data center A 102a comes back online within the threshold duration, data center B 102b sends the information blocks D1, D3, D5, P2, P4, P1 to data center A 102a to store in its corresponding storage resource 114a (FIG. 1) and data center B 102b deletes those blocks locally to free up local storage capacity. In this manner, any changes that were made to any of the data blocks D1, D3, D5 in data center B 102b during the outage of data center A 102a are reflected in the information blocks D1, D3, D5, P2, P4, P1 in data center A 102a so that data center A 102a has the most up-to-date information. For example, if a change was made to data block D1 in data center B 102b, updated data block D1 is sent to data center A 102a after data center A 102a recovers. Similarly, when changes are made to any of the data blocks D1-D5, the parity blocks P1-P5 are updated using FEC based on the most recent data blocks D1-D5. The updated parity blocks P1-P5 are then re-distributed across the data centers 102a,b.

If data center A 102a does not come back online within the threshold duration, data center B 102b can request provisioning of storage resources at a separate data center. In example FIG. 4B, the separate data center is shown as data center C 530. After provisioning of the storage resources at data center C 530, data center B 102b sends the reconstructed information blocks D1, D3, D5, P2, P4 and a copy of parity block P1 to data center C 530 to be stored in corresponding ones of the recently provisioned storage resources of data center C 530 and data center B 102b deletes those blocks locally to free up local storage capacity. In this manner, data center C 530 assumes the role of data center A 102a for the information blocks D1, D3, D5, P2, P4, P1 so that high availability of the data represented by the data blocks D1-D5 is provided by data center B 102b and data center C 530.

Figure 6:
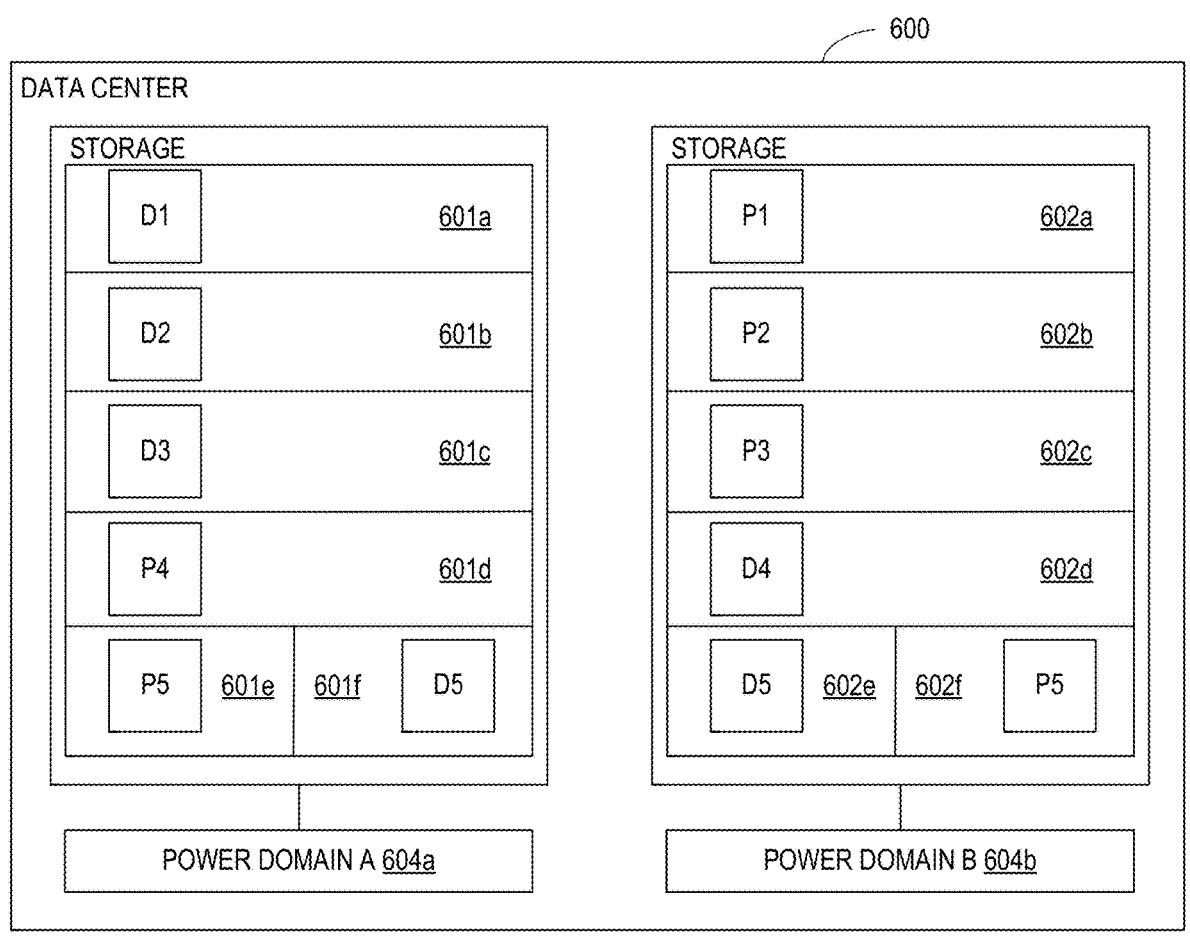
FIG. 6 is a block diagram of a single data center including storage resources located on different power domains to implement a failure recovery environment in the single data center.

FIG. 6 is a block diagram of a single data center 600 including storage resources 601a-601f and 602a-f located on different power domains 604a, 604b to implement a failure-recovery environment in the data center 600. The example storage resources 602a,b are substantially similar to the storage resources 114a,b of FIG. 1. In some examples, the storage resources 601a-f, 602a-f are storage resource nodes implemented as a first storage resource drawer that includes the storage resources 601a-f and a second storage resource drawer that includes storage resources 602a-f. In such examples, the storage resource drawers are connected to corresponding ones of the power domains 604a,b. In addition, the example storage resource drawers may be physically located in the same rack or separate racks. In yet other examples, the storage resources 601a-f may be implemented as nodes across multiple drawers in a single rack or across multiple racks. Similarly, the storage resources 602a-f may be implemented as nodes across multiple drawers in the same single rack or across multiple racks. In any case, the information blocks D1-D5 and P1-P5 are stored in corresponding ones of the storage resources 601a-f, 602a-f in the data center 600, as shown in FIG. 6.

In example FIG. 6, the storage resources 601a-f storing corresponding data blocks D1, D2, D3, D5 and parity blocks P4, P5 are connected to power domain A 604a, and the storage resources 602a-f storing corresponding parity blocks P1, P2, P3, P5 and data blocks D4, D5 are connected to power domain B 604b. Since the information blocks are distributed across different storage resources in the same data center 600, the data center 600 can tolerate a local failure of an entire one of the power domains 604a,b and up to one information block in the still-available one of the power domains 604a,b. That is, upon such failure, the data center 600 can reconstruct the failed information blocks based on the remaining five information blocks in the data center 600. Placing the storage resources 601a-f, 602a-f on different power domains provides isolation-based protection of the information blocks because even if one of the power domains 604a,b fails, the other one of the power domains 604a,b is not affected by such failure and continues to power its corresponding one of the storage resources 601a-f, 602a-f. Other forms of isolation-based protection that can be additionally or alternatively implemented include placing the storage resources 601a-f, 602a-f in separate availability zones such as separate buildings, separate server racks, separate floor space zones, separate floors, and/or separate rooms of the data center 600. In this manner, fire damage, water damage, and/or climate-control malfunctions affecting one server rack, zone, and/or room do not affect the storage resources in the other server rack, zone, and/or room. Upon failure of individual information blocks or failure of an entire power domain 604a,b, block reconstruction based on FEC and the information blocks of the still-available storage resources can be performed. Such recovery is substantially the same as described above in connection with FIG. 5C.

Figure 7:
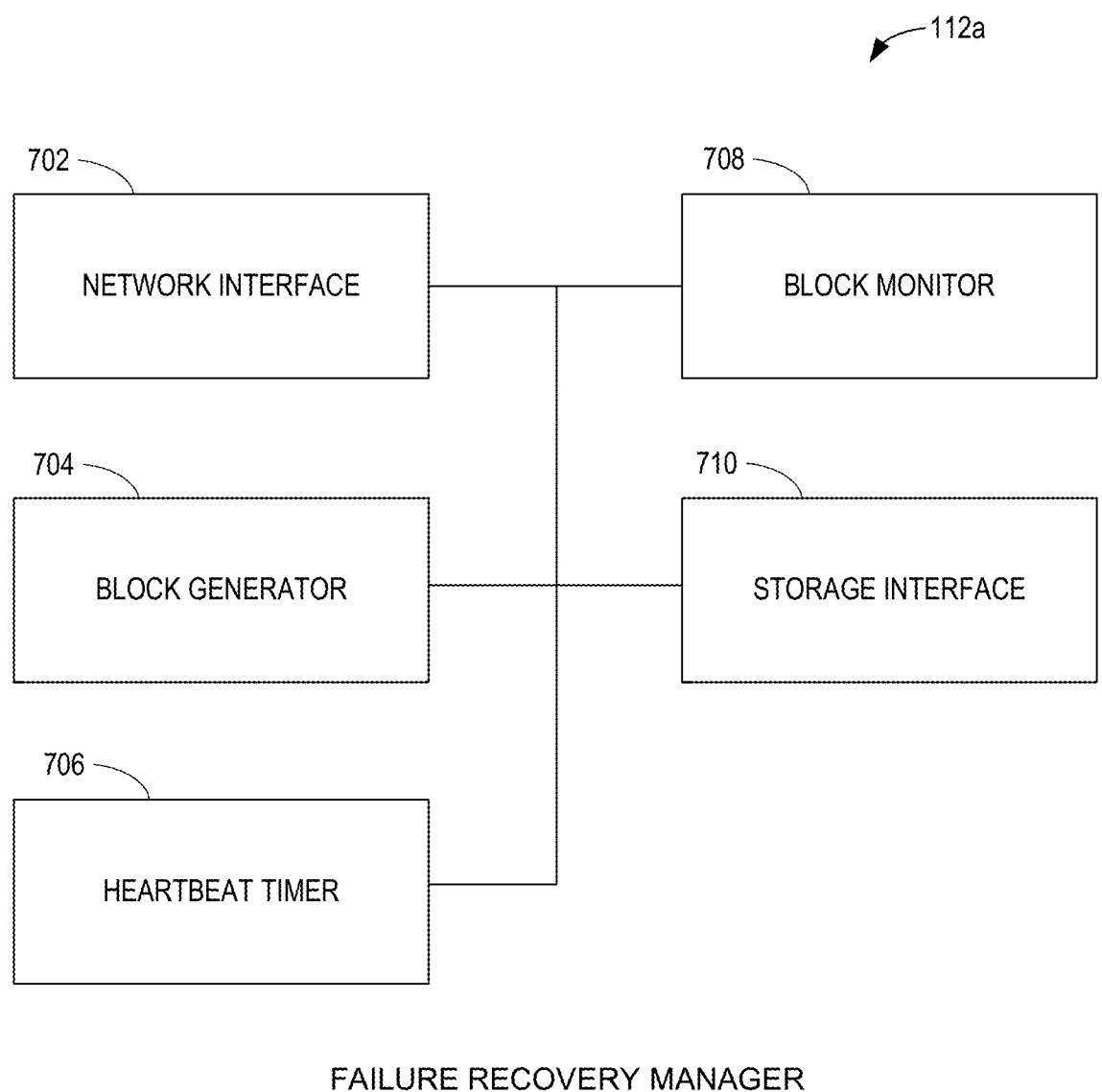
FIG. 7 is a block diagram of an example implementation of the failure recovery manager of FIG. 1.

FIG. 7 is a block diagram of an example implementation of the failure recovery manager 112a of FIG. 1. Although only one failure recovery manager 112a is shown, the other failure recovery manager 112b of FIG. 1 is structured and operates in substantially the same or identical way. The example failure recovery manager 112a is provided to generate information blocks, distribute information blocks between the storage resources 114a,b, perform failure monitoring, request reconstruction of failed information blocks, and/or reconstruct failed information blocks. The example failure recovery manager 112a includes a network interface 702, a block generator 704, a heartbeat timer 706, a block monitor 708, and a storage interface 710.

Example network interface 702 is provided to communicate via a network with other data centers (e.g., data center B 102b of FIG. 1), with other failure recovery managers (e.g., the failure recovery manager 112b of FIG. 1), and/or with other storage resources (e.g., the storage resource 114b of FIG. 1). For example, the network interface 702 can send and/or receive information blocks to and/or from other data centers and/or storage resources. The example network interface 702 can also monitor availability and/or failure of other data centers. The example network interface 702 can also send and/or receive data reconstruction requests (e.g., the reconstruction request 304 of FIG. 3A, the reconstruction request 514 of FIG. 5A) and/or copy requests (e.g., the copy request 312 of FIG. 3B, the copy request 522 of FIG. 5B). In some examples, the network interface 702 is circuitry instantiated by programmable circuitry executing network interface instructions and/or configured to perform operations such as those represented by the flowcharts of FIGS. 8-10.

The example block generator 704 is provided to generate information blocks. For example, the block generator 704 can generate parity blocks based on corresponding data blocks using FEC. The example block generator 704 may also reconstruct information blocks to replace failed information blocks. To reconstruct such information blocks, the example block generator 704 uses FEC. In some examples, the block generator 704 is circuitry instantiated by programmable circuitry executing block generator instructions and/or configured to perform operations such as those represented by the flowcharts of FIGS. 8-10.

The example heartbeat timer 706 is provided to generate a heartbeat signal indicative of availability or non-failure of a corresponding data center such as data center A 102a. For example, if the heartbeat timer 706 is located in data center A 102a, a heartbeat signal generated by the heartbeat timer 706 can be transmitted by the network interface 702 to data center B 102b. In this manner, data center B 102b can monitor the heartbeat signal from data center A 102a to determine when data center A 102a is available. If a heartbeat signal is not received at data center B 102b from data center A 102a within an expected time period, data center B 102b can determine that data center A 102a has failed. In turn, data center B 102b can initiate a data recovery process as described above in connection with FIG. 3C and/or FIG. 5C. In some examples, the heartbeat timer 706 is circuitry instantiated by programmable circuitry executing heartbeat timer instructions and/or configured to perform operations such as those represented by the flowcharts of FIGS. 8-10.

The example block monitor 708 is provided to monitor availabilities and/or failures of information blocks. For example, if the failure recovery manager 112a is implemented in the data center A 102a, the block monitor 708 monitors information blocks (e.g., data blocks and/or parity blocks) stored in the local storage resources 114a. Such monitoring can be performed by the block monitor 708 sending read requests to the storage resources 114a requesting to read the information blocks. If the read cannot be performed successfully, the block monitor 708 can determine that a corresponding information block has failed. The example block monitor 708 also generates reconstruction requests (e.g., the reconstruction request 304 of FIG. 3A, the reconstruction request 514 of FIG. 5A) and/or copy requests (e.g., the copy request 312 of FIG. 3B, the copy request 522 of FIG. 5B) after detection of a failed information block in a corresponding one of the storage resources 114a. For example, the block monitor 708 generates a reconstruction request to cause data center B 102b to recover the failed information block as a reconstructed information block based on at least some of the information blocks at the storage resources 114b of the data center B 102b. Alternatively, the block monitor 708 generates a copy request to cause data center B 102b to provide a copy of an available information block or copies of multiple available information blocks from the storage resources 114b to data center A 102a so that data center A 102a can locally reconstruct one or more failed information blocks. In some examples, the block monitor 708 is circuitry instantiated by programmable circuitry executing block monitor instructions and/or configured to perform operations such as those represented by the flowcharts of FIGS. 8-10.

The example storage interface 710 is provided to access storage resources such as the storage resources 114a of FIG. 1. For example, the storage interface 710 can write information blocks to different addresses of the storage resources 114a, read information blocks from different addresses of the storage resources 114a, and/or modify the contents of information blocks at different addresses of the storage resources 114a. In some examples, the storage interface 710 is connected to the storage resources 114a via a local bus. In other examples, the storage interface 710 is connected to the storage resources 114a via a network. In some examples, the storage interface 710 is circuitry instantiated by programmable circuitry executing storage interface instructions and/or configured to perform operations such as those represented by the flowcharts of FIGS. 8-10.

The failure recovery manager 112a of FIG. 7 may be instantiated (e.g., creating an instance of, bring into being for any length of time, materialize, implement, etc.) by programmable circuitry such as a Central Processor Unit (CPU) executing first instructions. Additionally or alternatively, the failure recovery manager 112a of FIG. 7 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 7 may, thus, be instantiated at the same or different times. Some or all of the circuitry of FIG. 7 may be instantiated, for example, in one or more threads executing concurrently on hardware and/or in series on hardware. Moreover, in some examples, some or all of the circuitry of FIG. 7 may be implemented by microprocessor circuitry executing instructions and/or FPGA circuitry performing operations to implement one or more virtual machines and/or containers.

As described above, the example network interface 702, the example block generator 704, the example heartbeat timer 706, the example block monitor 708, and the example storage interface 710 of FIG. 7 are structures. Such structures may implement means for performing corresponding disclosed functions. Examples of such functions are described above in connection with corresponding ones of the example network interface 702, the example block generator 704, the example heartbeat timer 706, the example block monitor 708, and the example storage interface 710 and are described below in connection with the flowcharts of FIGS. 8-10.

While an example manner of implementing the failure recovery manager 112a of FIG. 1 is illustrated in FIG. 7, one or more of the elements, processes, and/or devices illustrated in FIG. 7 may be combined, divided, re-arranged, omitted, eliminated, and/or implemented in any other way. Further, the example network interface 702, the example block generator 704, the example heartbeat timer 706, the example block monitor 708, the example storage interface 710, and/or, more generally, the example failure recovery manager 112a of FIG. 7, may be implemented by hardware alone or by hardware in combination with software and/or firmware. Thus, for example, any of the example network interface 702, the example block generator 704, the example heartbeat timer 706, the example block monitor 708, the example storage interface 710, and/or, more generally, the example failure recovery manager 112a, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example failure recovery manager 112a of FIG. 7 may include one or more elements, processes, and/or devices in addition to, or instead of, those illustrated in FIG. 7, and/or may include more than one of any or all of the illustrated elements, processes and devices.

Figure 8:
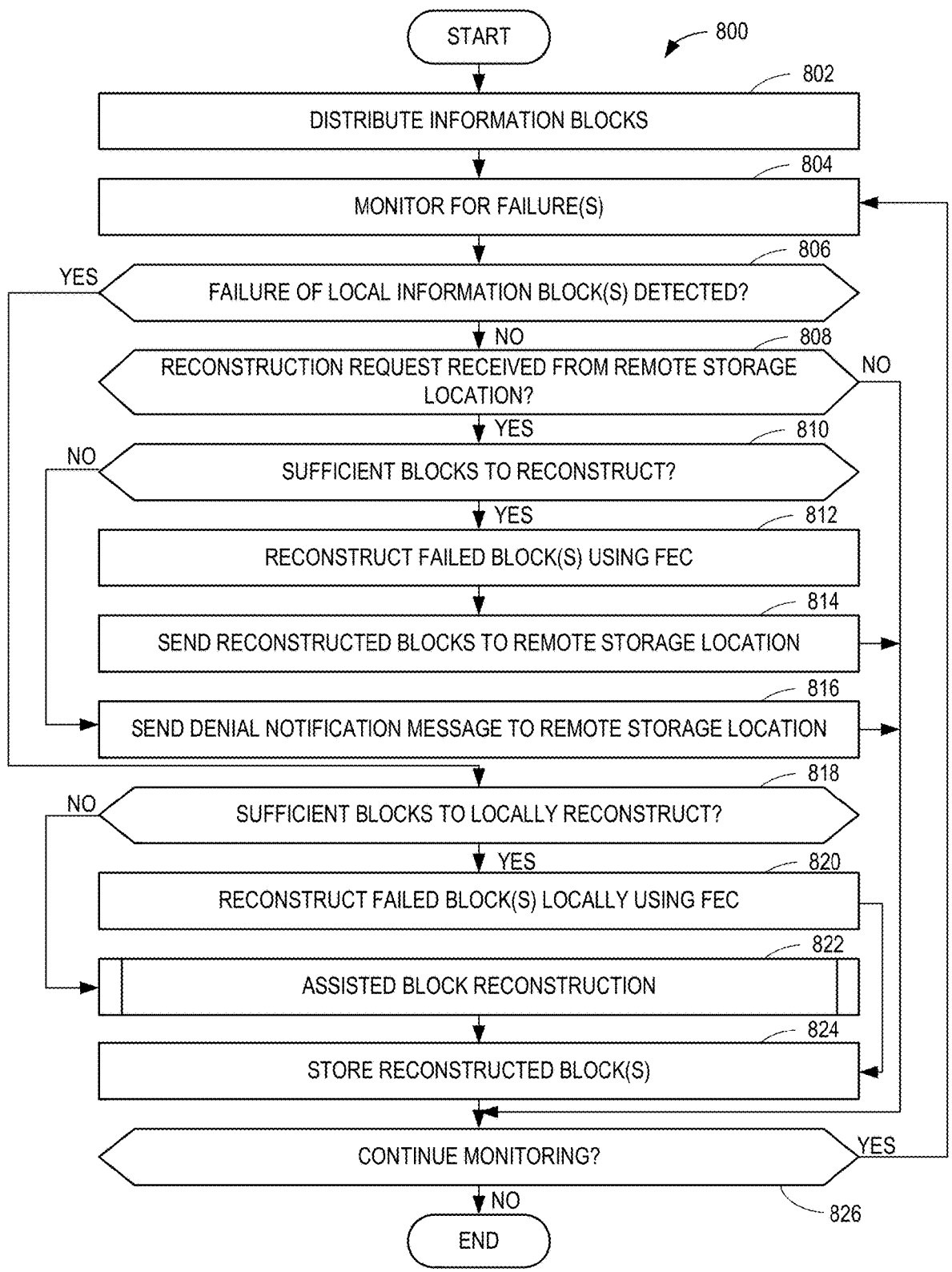
FIG. 8 is a flowchart representative of example machine-readable instructions and/or example operations that may be executed, instantiated, and/or performed by example programmable circuitry to implement the failure recovery manager of FIGS. 1 and 7.
Figure 9:
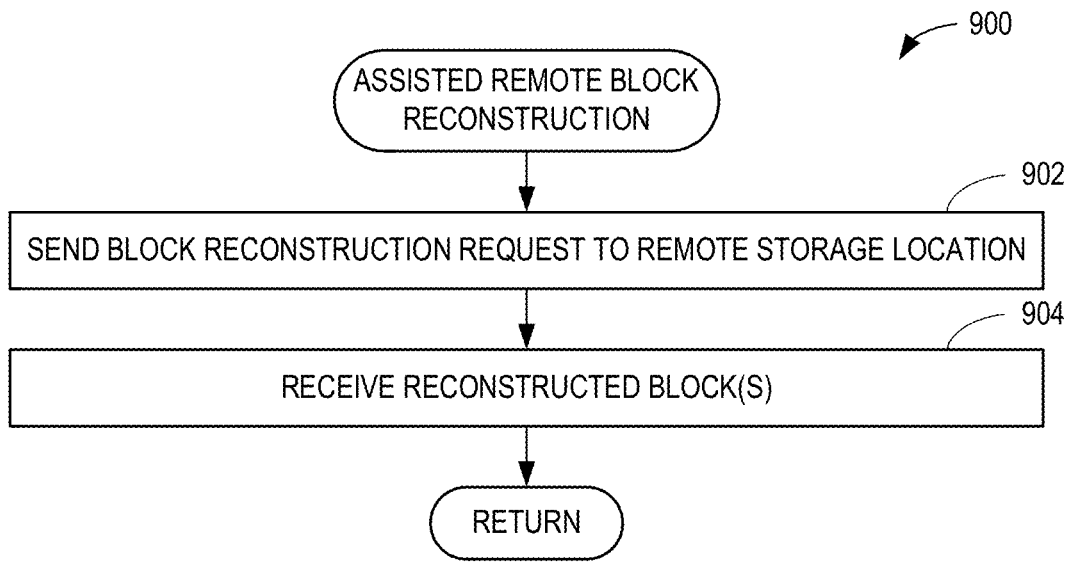
FIG. 9 is a flowchart representative of example machine-readable instructions and/or example operations that may be executed, instantiated, and/or performed by example programmable circuitry to implement the failure recovery manager of FIGS. 1 and 7 to perform assisted remote block reconstruction.
Figure 10:
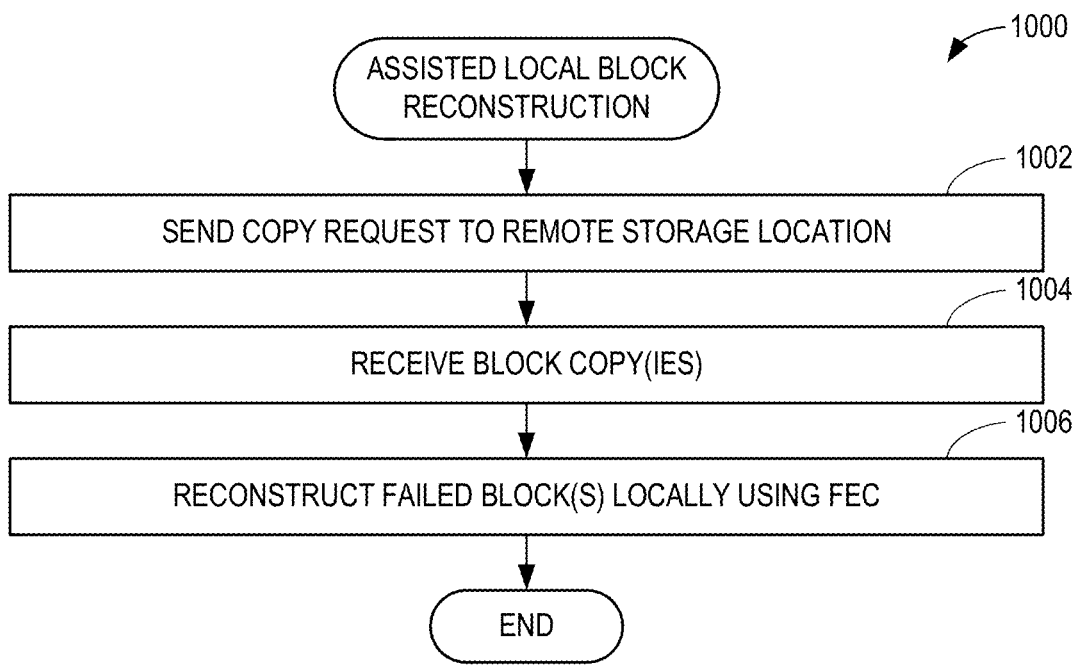
FIG. 10 is a flowchart representative of example machine-readable instructions and/or example operations that may be executed, instantiated, and/or performed by example programmable circuitry to implement the failure recovery manager of FIGS. 1 and 7 to perform assisted local block reconstruction.

Flowcharts representative of example machine-readable instructions, which may be executed by programmable circuitry to implement and/or instantiate the failure recovery manager 112a of FIG. 7 and/or representative of example operations which may be performed by programmable circuitry to implement and/or instantiate the failure recovery manager 112a of FIG. 7, are shown in FIGS. 8-10. The machine-readable instructions may be one or more executable programs or portion(s) of one or more executable programs for execution by programmable circuitry such as the programmable circuitry 1112 shown in the example processor platform 1100 discussed below in connection with FIG. 11 and/or may be one or more function(s) or portion(s) of functions to be performed by the example programmable circuitry (e.g., an FPGA) discussed below in connection with FIGS. 12 and/or 13. In some examples, the machine-readable instructions cause an operation, a task, etc., to be carried out and/or performed in an automated manner in the real world. As used herein, "automated" means without human involvement.

The program(s) may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entirety of the program(s) and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program(s) is/are described with reference to the flowcharts illustrated in FIGS. 8-10, many other methods of implementing the example failure recovery manager 112a may alternatively be used. For example, the order of execution of the blocks of the flowchart(s) may be changed, and/or some of the blocks described may be changed, eliminated, or combined. Additionally or alternatively, any or all of the blocks of the flowcharts may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine-executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-10 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

FIG. 8 is a flowchart representative of example machine-readable instructions and/or example operations 800 that may be executed, instantiated, and/or performed by example programmable circuitry to implement the failure recovery manager 112a of FIGS. 1 and 7. The instructions and/or operations 800 of FIG. 8 may be used to implement the example failure recovery manager 112a to generate information blocks, distribute information blocks between the storage resources 114a,b, perform failure monitoring, request reconstruction of failed information blocks, and/or reconstruct failed information blocks. Although the flowchart of FIG. 8 is described relative to the failure recovery manager 112a, the failure recovery manager 112b may be implemented in substantially the same or identical way. In addition, although the flowchart of FIG. 8 is described relative to data center A 102a as a local storage location and data center B 102b as a remote storage location, the labels "local" and "remote" are relative to one another such that data center B 102b may be a local storage location in which the instructions and/or operations of FIG. 8 are instantiated and data center A 102a may be the remote storage location. In addition, the instructions and/or operations 800 of FIG. 8 may be implemented in a single data center such as the data center 600 of FIG. 6, in which case the labels "local" and "remote" are used to distinguish between the storage resources 601a-f on power domain A 604a and the storage resources 602a-f on power domain B 604b. In such an example, the failure recovery manager 112a manages information blocks in the storage resources 601a-f on power domain A 604a, and the failure recovery manager 112b manages information blocks in the storage resources 602a-f on power domain B 604b.

The instructions and/or operations 800 of FIG. 8 begin at block 802 at which the example network interface 702 and the storage interface 710 distribute information blocks. For example, the network interface 702 can send some information blocks (e.g., data blocks and/or parity blocks) of an information block group from a local storage location such as data center A 102a to a remote storage location such as data center B 102b so that remote data center B 102b can store those information blocks in the remote storage resources 114b. In addition, the storage interface 710 can store remaining ones of the information blocks (e.g., data blocks and/or parity blocks) of the information block group in the local storage resources 114a of the local data center A 102a.

The example block monitor 708 monitors for failure(s) (block 804). For example, the block monitor 708 monitors for failure(s) of any local information block(s) in the local storage resources 114a and monitors heartbeat signals from the remote data center B 102b (e.g., from a heartbeat timer of the remote data center B 102b). In this manner, the example block monitor 708 can determine whether any local information block has failed and/or can determine whether the remote data center B 102b has failed. The example block monitor 708 determines whether a failure of one or more local information block(s) has been detected (block 806). If failure of one or more local information block(s) is detected (block 806: YES), control advances to block 818. Otherwise, if failure of one or more local information block(s) is not detected (block 806: NO), the example block monitor 708 determines whether a reconstruction request to reconstruct one or more failed information block(s) has been received from the remote storage location (block 808). For example, the block monitor 708 determines whether a reconstruction request to reconstruct one or more failed information block (s) has been received from the remote data center B 102b. If a reconstruction request has not been received (block 808: NO), control advances to block 826. Otherwise, if a reconstruction request has been received (block 808: YES), the example block generator 704 determines whether there are sufficient available information blocks in the local data center A 102a to perform the reconstruction (block 810). If the example block generator 704 determines that there are not sufficient local available information blocks (block 810: NO), control proceeds to block 816 at which the example network interface 702 sends a denial notification to the remote storage location. For example, the block generator 704 can generate the denial notification to indicate to the remote data center B 102b that the local data center A 102a is not able to process the block reconstruction request and can provide the denial notification to the network interface 702. Otherwise, if there are sufficient information blocks (block 810: YES), the example block generator 704 reconstructs the failed information block(s) of the remote storage location using FEC (block 812). For example, the block generator 704 generates reconstructed information block(s) by reconstructing the failed information block(s) using FEC and still-available information blocks in the local storage resources 114a of the local data center A 102a. The example block generator 704 also adds any corresponding metadata to the reconstructed information block(s). The example network interface 702 sends the reconstructed information block(s) to the remote storage location (block 814). For example, the network interface 702 sends the reconstructed information block(s) to the remote data center B 102b.

At block 818, the example block generator 704 determines whether there are sufficient available information blocks to locally reconstruct the local failed information block(s). For example, the block generator 704 determines whether there are sufficient available information blocks in the local storage resources 114a to perform local block reconstruction. If there are sufficient available information blocks to locally reconstruct the failed information block(s) (block 818: YES), the example block generator 704 reconstructs the failed information block(s) locally using FEC (block 820). For example, the block generator 704 generates reconstructed information block(s) by reconstructing the failed information block(s) using FEC and still-available information blocks in the local storage resources 114a of the local data center A 102a. The example block generator 704 also adds any corresponding metadata to the reconstructed information block(s). Control then advances to block 824. However, if there are not sufficient available information blocks to locally reconstruct (block 818: NO), control advances to block 822 at which the example failure recovery manager 112a performs an assisted block reconstruction process. Example instructions and/or operations to perform assisted block reconstruction are described below in connection with FIGS. 9 and 10.

The example storage interface 710 stores the reconstructed information block(s) in the local storage resources 114a (block 824). For example, the storage interface 710 writes the reconstructed information block(s) to the local storage resources 114a to replace the corresponding failed information block(s). The example block monitor 708 determines whether to continue monitoring (block 826). For example, the block monitor 708 can determine to continue monitoring as long it has not received a stop monitoring command and or as long as the failure recovery manager 112a is enabled. If the example block monitor 708 determines that it should continue monitoring (block 826: YES), control returns to block 804. Otherwise, the example instructions and/or operations 800 of FIG. 8 end. Although the instructions and/or operations 800 of FIG. 8 are shown in sequential fashion, the instructions and/or operations 800 represented in FIG. 8 can be performed in parallel to monitor multiple information blocks and/or block groups in concurrently and/or to recover multiple information blocks in concurrently. For example, the instructions and/or operations 800 may be implemented using synchronous programming to carry out multiple resource monitoring and/or multiple block reconstruction in a synchronous manner. As such, the continue monitoring block 828 is merely representative of an example manner of ceasing block monitoring activities altogether by the failure recovery manager 112*a* due to, for example, a power down event, a stop monitoring command, a power failure, etc.

FIG. 9 is a flowchart representative of example machine-readable instructions and/or example operations 900 that may be executed, instantiated, and/or performed by example programmable circuitry to implement the failure recovery manager 112A of FIGS. 1 and 7 to perform assisted remote block reconstruction. The example instructions and/or example operations 900 may be used to implement block 822 of FIG. 8. The instructions and/or operations 900 of FIG. 9 begin at block 902 at which the example network interface 702 sends a block reconstruction request to the remote storage location. For example, the block monitor 708 generates the reconstruction request (e.g., the reconstruction request 304 of FIG. 3A, the reconstruction request 514 of FIG. 5A) and provides the reconstruction request to the example network interface 702 to send to the failure recovery manager 112*b* of the remote data center B 102*b*. The example block monitor 708 includes a block group identifier, one or more block identifiers of the information block(s) to be reconstructed, and a reconstruction command code in the reconstruction request. The reconstruction command code causes remote data center B 102*b* to reconstruct the information block(s) identified in the reconstruction request. Subsequently, the example network interface 702 receives the reconstructed information block(s) (block 904). For example, the network interface 702 receives the reconstructed information block(s) from data center B 102*b* after data center B 102*b* generates the reconstructed information block(s) in response to the reconstruction request of block 902. The example instructions and/or operations 900 of FIG. 9 end and control returns to the example instructions and/or operations 800 of FIG. 8.

FIG. 10 is a flowchart representative of example machine-readable instructions and/or example operations 1000 that may be executed, instantiated, and/or performed by example programmable circuitry to implement the failure recovery manager 112*a* of FIGS. 1 and 7 to perform assisted local block reconstruction. The example instructions and/or example operations 900 represent an alternative manner of implementing block 822 of FIG. 8 relative to the assisted remote block reconstruction process of FIG. 9. The instructions and/or operations 1000 of FIG. 10 begin at block 1002 at which the example network interface 702 sends a copy request to the remote storage location. For example, the block monitor 708 generates the copy request (e.g., the copy request 312 of FIG. 3A, the copy request 522 of FIG. 5A) and provides the copy request to the example network interface 702 to send to the failure recovery manager 112*b* of the remote data center B 102*b*. The example block monitor 708 includes a block group identifier and a block copy command code in the copy request. The block copy command code causes remote data center B 102*b* to provide a copy or copies of one or more information block(s) corresponding to the block group identified in the copy request.

Subsequently, the example network interface 702 receives the block copy(ies) (block 1004). For example, the network interface 702 receives the block copy(ies) from data center B 102*b* after data center B 102*b* reads and transmits the block copy(ies) in response to the copy request of block 1002. The example block generator 704 reconstructs the failed information block(s) locally using FEC (block 1006). For example, the block generator 704 generates reconstructed information block(s) by reconstructing the failed information block(s) using FEC, still-available information blocks in the local storage resources 114*a* of the local data center A 102*a* and the block copy(ies) received from remote data center B 102*b*. The example block generator 704 also adds any corresponding metadata to the reconstructed information block(s). The example instructions and/or operations 1000 of FIG. 10 end and control returns to the example instructions and/or operations 800 of FIG. 8.

Figure 11:
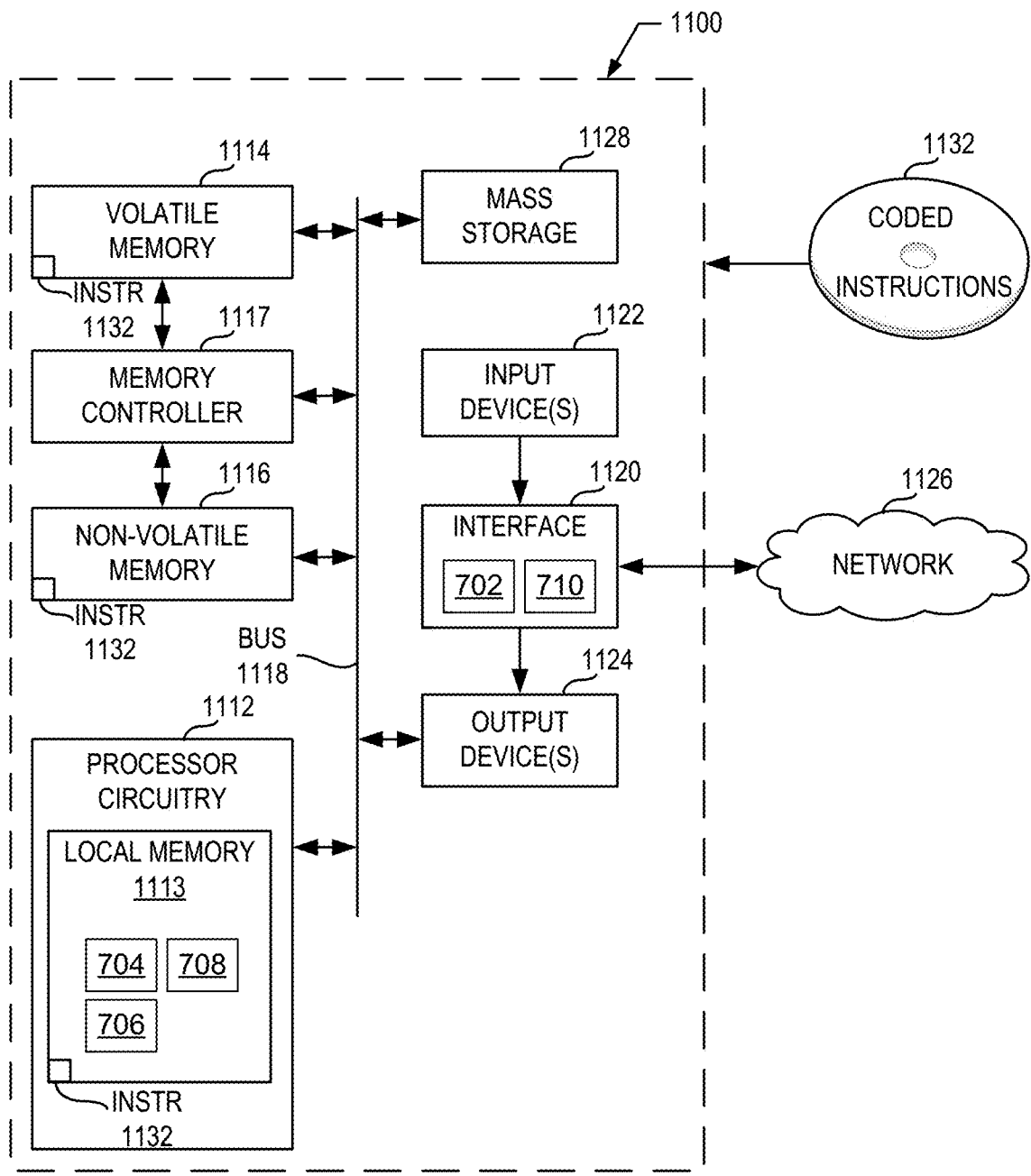
FIG. 11 is a block diagram of an example processing platform including programmable circuitry structured to execute, instantiate, and/or perform the example machine-readable instructions and/or perform the example operations of FIGS. 8-10 to implement the failure recovery manager of FIG. 7.

FIG. 11 is a block diagram of an example programmable circuitry platform 1100 structured to execute and/or instantiate the example machine-readable instructions and/or the example operations of FIGS. 8-10 to implement the failure recovery manager 112*a* of FIG. 7. The programmable circuitry platform 1100 can be, for example, a server, a personal computer, a workstation, a self-learning machine (e.g., a neural network), an Internet appliance, or any other type of computing and/or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs, microprocessors, CPUs, GPUs, DSPs, and/or microcontrollers from any desired family or manufacturer. The programmable circuitry 1112 may be implemented by one or more semiconductor based (e.g., silicon based) devices. In this example, the programmable circuitry 1112 implements the block generator 704, the heartbeat timer 706, and the block monitor 708.

The programmable circuitry 1112 of the illustrated example includes a local memory 1113 (e.g., a cache, registers, etc.). The programmable circuitry 1112 of the illustrated example is in communication with main memory 1114, 1116, which includes a volatile memory 1114 and a non-volatile memory 1116, by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In the illustrated example, the interface circuitry 1120 implements the network interface 702 and the storage interface 710 of FIG. 7 to communicate with data centers and/or storage resources via the network 1126. Additionally or alternatively, the storage interface 710 may be implemented by the processor circuitry 1112 to communicate with one or more mass storage devices 1128 of the programmable circuitry platform 1100.

In the illustrated example, one or more input devices 1122 are connected to the interface circuitry 1120. The input device(s) 1122 permit(s) a user (e.g., a human user, a machine user, etc.) to enter data and/or commands into the programmable circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. The example network 1126 may implement the network 104 of FIG. 1.

The programmable circuitry platform 1100 of the illustrated example also includes one or more mass storage discs or devices 1128 to store firmware, software, and/or data. Examples of such mass storage discs or devices 1128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1132, which may be implemented by the machine-readable instructions of FIGS. 8-10, may be stored in the mass storage device 1128, in the volatile memory 1114, in the non-volatile memory 1116, and/or on at least one non-transitory computer-readable storage medium such as a CD or DVD which may be removable.

Figure 12:
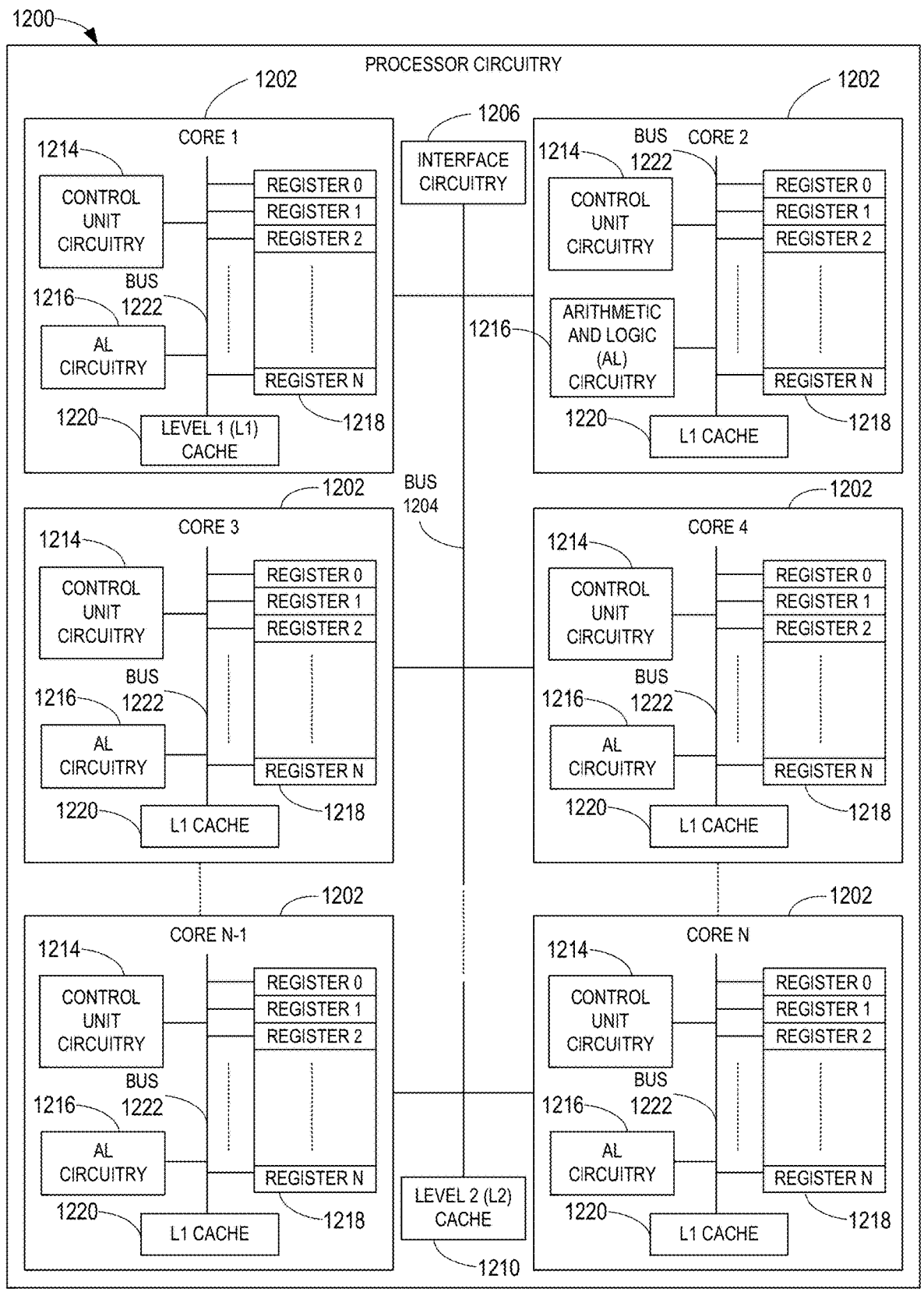
FIG. 12 is a block diagram of an example implementation of the programmable circuitry of FIG. 11.

FIG. 12 is a block diagram of an example implementation of the programmable circuitry 1112 of FIG. 11. In this example, the programmable circuitry 1112 of FIG. 11 is implemented by a microprocessor 1200. For example, the microprocessor 1200 may be a general-purpose microprocessor (e.g., general-purpose microprocessor circuitry). The microprocessor 1200 executes some or all of the machine-readable instructions of the flowcharts of FIGS. 8-10 to effectively instantiate the circuitry of FIG. 7 as logic circuits to perform operations corresponding to those machine-readable instructions. In some such examples, the circuitry of FIG. 7 is instantiated by the hardware circuits of the microprocessor 1200 in combination with the machine-readable instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine-readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine-readable instructions and/or operations represented by the flowcharts of FIGS. 8-10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer-based operations. In other examples, the AL circuitry 1216 also performs floating-point operations. In yet other examples, the AL circuitry 1216 may include first AL circuitry that performs integer-based operations and second AL circuitry that performs floating-point operations. In some examples, the AL circuitry 1216 may be referred to as an Arithmetic Logic Unit (ALU).

The registers 1218 are semiconductor-based structures to store data and/or instructions such as results of one or more of the operations performed by the AL circuitry 1216 of the corresponding core 1202. For example, the registers 1218 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure, such as by being distributed throughout the core 1202 to shorten access time. The second bus 1222 may be implemented by at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages.

The microprocessor 1200 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1200, in the same chip package as the microprocessor 1200 and/or in one or more separate packages from the microprocessor 1200.

Figure 13:
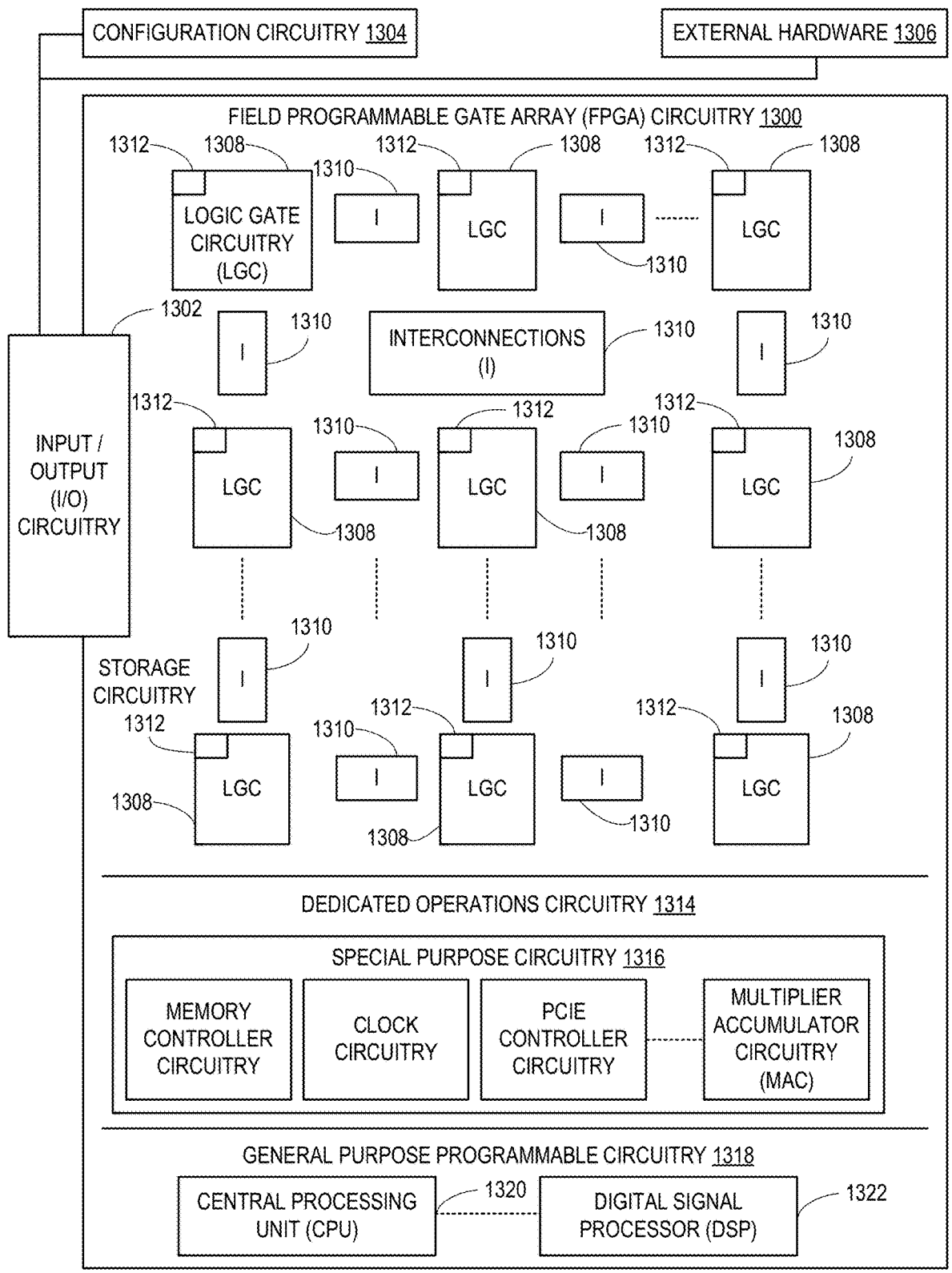
FIG. 13 is a block diagram of another example implementation of the programmable circuitry of FIG. 11.

FIG. 13 is a block diagram of another example implementation of the programmable circuitry 1112 of FIG. 11. In this example, the programmable circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine-readable instructions. However, once configured, the FPGA circuitry 1300 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1200 of FIG. 12 described above (which is a general purpose device that may be programmed to execute some or all of the machine-readable instructions represented by the flowcharts of FIGS. 8-10 but whose interconnections and logic circuitry are fixed once fabricated), the FPGA circuitry 1300 of the example of FIG. 13 includes interconnections and logic circuitry that may be configured, structured, programmed, and/or interconnected in different ways after fabrication to instantiate, for example, some or all of the operations/functions corresponding to the machine-readable instructions represented by the flowcharts of FIGS. 8-10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 8-10. As such, the FPGA circuitry 1300 may be configured and/or structured to effectively instantiate some or all of the operations/functions corresponding to the machine-readable instructions of the flowcharts of FIGS. 8-10 as dedicated logic circuits to perform the operations/functions corresponding to those software instructions in a dedicated manner analogous to an ASIC. Therefore, the FPGA circuitry 1300 may perform the operations/functions corresponding to the some or all of the machine-readable instructions of FIGS. 8-10 faster than the general-purpose microprocessor can execute the same.

In the example of FIG. 13, the FPGA circuitry 1300 is configured and/or structured in response to being programmed (and/or reprogrammed one or more times) based on a binary file. In some examples, the binary file may be compiled and/or generated based on any suitable programming language. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that obtains a binary file to program or configure the FPGA circuitry 1300. In some examples, the external hardware 1306 may be implemented by external hardware circuitry. For example, the external hardware 1306 may be implemented by the microprocessor 1200 of FIG. 12.

The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations/functions that may correspond to at least some of the machine-readable instructions of FIGS. 8-10 and/or other desired operations. The logic gate circuitry 1308 shown in FIG. 13 is fabricated in blocks or groups of electrical structures such as logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations/functions. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example dedicated operations circuitry 1314. In this example, the dedicated operations circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the programmable circuitry 1112 of FIG. 11, many other approaches are contemplated. For example, FPGA circuitry may include an on-board CPU, such as one or more of the example CPU 1320 of FIG. 12. Therefore, the programmable circuitry 1112 of FIG. 11 may additionally be implemented by combining at least the example microprocessor 1200 of FIG. 12 and the example FPGA circuitry 1300 of FIG. 13. In some such hybrid examples, one or more cores 1202 of FIG. 12 may execute a first portion of the machine-readable instructions represented by the flowcharts of FIGS. 8-10 to perform first operation(s)/function(s), the FPGA circuitry 1300 of FIG. 13 may be configured and/or structured to perform second operation(s)/function(s) corresponding to a second portion of the machine-readable instructions represented by the flowcharts of FIG. 8-10, and/or an ASIC may be configured and/or structured to perform third operation(s)/function(s) corresponding to a third portion of the machine-readable instructions represented by the flowcharts of FIGS. 8-10.

It should be understood that some or all of the circuitry of FIG. 7 may, thus, be instantiated at the same or different times. For example, same and/or different portion(s) of the microprocessor 1200 of FIG. 12 may be programmed to execute portion(s) of machine-readable instructions at the same and/or different times. In some examples, same and/or different portion(s) of the FPGA circuitry 1300 of FIG. 13 may be configured and/or structured to perform operations/functions corresponding to portion(s) of machine-readable instructions at the same and/or different times.

In some examples, some or all of the circuitry of FIG. 7 may be instantiated, for example, in one or more threads executing concurrently and/or in series. For example, the microprocessor 1200 of FIG. 12 may execute machine-readable instructions in one or more threads executing concurrently and/or in series. In some examples, the FPGA circuitry 1300 of FIG. 13 may be configured and/or structured to carry out operations/functions concurrently and/or in series. Moreover, in some examples, some or all of the circuitry of FIG. 7 may be implemented within one or more virtual machines and/or containers executing on the microprocessor 1200 of FIG. 12.

In some examples, the programmable circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the programmable circuitry 1112 of FIG. 11, which may be in one or more packages. For example, the XPU may include a CPU (e.g., the microprocessor 1200 of FIG. 12, the CPU 1320 of FIG. 13, etc.) in one package, a DSP (e.g., the DSP 1322 of FIG. 13) in another package, a GPU in yet another package, and an FPGA (e.g., the FPGA circuitry 1300 of FIG. 13) in still yet another package.

Figure 14:
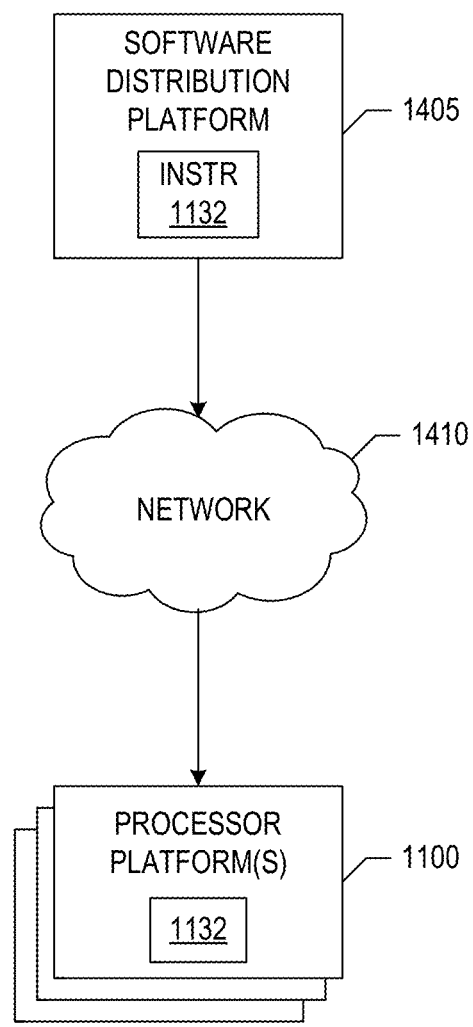
FIG. 14 is a block diagram of an example software/firmware/instructions distribution platform (e.g., one or more servers) to distribute software, instructions, and/or firmware (e.g., corresponding to the example machine-readable instructions of FIGS. 8-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine-readable instructions 1132 of FIG. 11 to other hardware devices (e.g., hardware devices owned and/or operated by third parties from the owner and/or operator of the software distribution platform) is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine-readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine-readable instructions 1132, which may correspond to the example machine-readable instructions of FIGS. 8-10, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1132 from the software distribution platform 1405. For example, the software, which may correspond to the example machine-readable instructions of FIG. 8-10, may be downloaded to the example programmable circuitry platform 1100, which is to execute the machine-readable instructions 1132 to implement the failure recovery manager 112a. In some examples, one or more servers of the software distribution platform 1405 periodically offer, transmit, and/or force updates to the software (e.g., the example machine-readable instructions 1132 of FIG. 11) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed to implement failure recovery of data. Disclosed systems, apparatus, articles of manufacture, and methods improve the efficiency of using a computing device by using data reconstruction techniques to achieve data durability in the event of failures such as data loss, data corruption, resource failures, disasters, etc. For example, techniques disclosed herein provide failure-recovery configurations across multiple data storage resources without needing to store identical duplicative instances of the data across those multiple data storage resources. Examples disclosed herein partition data of interest and corresponding parity information across multiple information blocks that are unique relative to one another and from which a failed one of those blocks can be reconstructed based on others of the blocks that remain available. By partitioning data and parity information across multiple information blocks stored in different storage resources and using data reconstruction techniques to recover lost data, examples disclosed herein decrease the amount of storage capacity used to implement failure recovery of data relative to prior approaches. As such, disclosed systems, apparatus, articles of manufacture, and methods are directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
a storage interface to write first information blocks of a plurality of information blocks in first storage, the information blocks including data blocks and parity blocks;
a network interface to:
send second information blocks of the information blocks to second storage; and
receive a request from the second storage to reconstruct a first failed information block of the second storage;
a block generator to generate a first reconstructed information block by reconstructing the first failed information block after a determination that the first failed information block can be reconstructed based on available ones of the first information blocks in the first storage, wherein the network interface is to send the first reconstructed information block to the second storage to replace the first failed information block in the second storage; and
a block monitor to generate a second request after a determination that a second failed information block of the first storage cannot be reconstructed based on the available ones of the first information blocks in the first storage, the second request to cause the second storage to generate a second reconstructed information block by reconstructing the second failed information block based on at least some of the second information blocks in the second storage, wherein the network interface is to send the second request to a failure recovery manager at the second storage.

2. The apparatus of claim 1, wherein the block generator is to generate the first reconstructed information block based on forward error correction.

3. The apparatus of claim 1, wherein the first information blocks include at least some of the data blocks and at least one of the parity blocks, the second information blocks to include at least some of the parity blocks and at least one of the data blocks.

4. The apparatus of claim 1, wherein the network interface is to send the second information blocks from a first data center to a second data center, the first storage located in the first data center, the second storage located in the second data center.

5. The apparatus of claim 1, wherein the first information blocks in the first storage include different information relative to the second information blocks in the second storage.

6. The apparatus of claim 1, wherein the first storage is in a first power domain of a data center and the second storage is in a second power domain of the data center.

7. The apparatus of claim 1, wherein the first storage includes a plurality of storage resource nodes, ones of the first information blocks stored in corresponding ones of the storage resource nodes.

8. The apparatus of claim 1, wherein the first information blocks in the first storage are non-duplicative of the second information blocks in the second storage, wherein:
the storage interface is to write at least one of the second information blocks in the first storage;
the network interface is to send at least one of the first information blocks to the second storage to cause storage of the at least one of the first information blocks in the second storage; and
the block generator is to reconstruct a third failed information block at the first storage based on some of the first information blocks and the at least one of the second information blocks in the first storage.

9. A non-transitory computer-readable medium comprising instructions to cause programmable circuitry to at least:
write first information blocks in first storage;
cause transmission of second information blocks to second storage, the first and second information blocks including data blocks and parity blocks;
access a request from the second storage to reconstruct a first failed information block of the second storage;
generate a first reconstructed information block corresponding to the first failed information block after a determination that the first failed information block can be reconstructed based on available ones of the first information blocks in the first storage;
send the first reconstructed information block to the second storage to replace the first failed information block in the second storage;
generate a second request after a determination that a second failed information block of the first storage cannot be reconstructed based on the available ones of the first information blocks in the first storage, the second request to cause the second storage to generate a second reconstructed information block by reconstructing the second failed information block based on at least some of the second information blocks in the second storage; and
cause transmission of the second request to a failure recovery manager at the second storage.

10. The non-transitory computer-readable medium of claim 9, wherein the instructions are to cause the programmable circuitry to generate the first reconstructed information block based on forward error correction.

11. The non-transitory computer-readable medium of claim 9, wherein the first information blocks include at least some of the data blocks and at least one of the parity blocks, the second information blocks to include at least some of the parity blocks and at least one of the data blocks.

12. The non-transitory computer-readable medium of claim 9, wherein the instructions are to cause the programmable circuitry to cause the transmission of the second information blocks from a first data center to a second data center, the first storage located in the first data center, the second storage located in the second data center.

13. The non-transitory computer-readable medium of claim 9, wherein the first information blocks in the first storage include different information relative to the second information blocks in the second storage.

14. The non-transitory computer-readable medium of claim 9, wherein the first storage is in a first power domain of a data center and the second storage is in a second power domain of the data center.

15. The non-transitory computer-readable medium of claim 9, wherein the first storage includes a plurality of storage resource nodes, ones of the first information blocks stored in corresponding ones of the storage resource nodes.

16. The non-transitory computer-readable medium of claim 9, wherein the first information blocks in the first storage are non-duplicative of the second information blocks in the second storage, wherein the instructions are to cause the programmable circuitry to:

cause storage of at least one of the second information blocks in the first storage;

cause transmission of at least one of the first information blocks to the second storage to cause storage of the at least one of the first information blocks in the second storage; and reconstruct a third failed information block at the first storage based on some of the first information blocks and the at least one of the second information blocks in the first storage.

17. The non-transitory computer-readable medium of claim 16, wherein the programmable circuitry is to reconstruct the third failed information block at the first storage after the second storage fails.

18. A method comprising:

writing first information blocks in first storage;

transmitting second information blocks to second storage, the first and second information blocks including data blocks and parity blocks;

accessing a request from the second storage to reconstruct a first failed information block of the second storage;

generating a first reconstructed information block corresponding to the first failed information block after a determination that the first failed information block can be reconstructed based on available ones of the first information blocks in the first storage;

sending the first reconstructed information block to the second storage to replace the first failed information block in the second storage;

generating a second request after a determination that a second failed information block cannot be reconstructed based on the available ones of the first information blocks in the first storage, the second request to cause the second storage to generate a second reconstructed information block by reconstructing the second failed information block based on at least some of the second information blocks in the second storage; and transmitting the second request to a failure recovery manager at the second storage.

19. The method of claim 18, wherein the generating of the first reconstructed information block is based on forward error correction.

20. The method of claim 18, including transmitting the second information blocks from a first data center to a second data center, the first storage located in the first data center, the second storage located in the second data center.

21. The method of claim 18, wherein the first information blocks include at least some of the data blocks and at least one of the parity blocks, the second information blocks to include at least some of the parity blocks and at least one of the data blocks.

22. The method of claim 18, wherein the first information blocks in the first storage include different information relative to the second information blocks in the second storage.

23. The method of claim 18, wherein the first information blocks in the first storage are non-duplicative of the second information blocks in the second storage, the method including:

storing at least one of the second information blocks in the first storage;

transmitting at least one of the first information blocks to the second storage to cause storage of the at least one of the first information blocks in the second storage; and reconstructing a third failed information block at the first storage based on some of the first information blocks and the at least one of the second information blocks in the first storage.

* * * * *